US010618595B2

(12) United States Patent
Voss

(10) Patent No.: US 10,618,595 B2
(45) Date of Patent: Apr. 14, 2020

(54) VEHICLE

(71) Applicant: Darrell W Voss, Chehalis, WA (US)

(72) Inventor: Darrell W Voss, Chehalis, WA (US)

( * ) Notice: Subject to any disclaimer, the term of this patent is extended or adjusted under 35 U.S.C. 154(b) by 81 days.

(21) Appl. No.: 15/796,053

(22) Filed: Oct. 27, 2017

(65) Prior Publication Data

US 2018/0273137 A1 Sep. 27, 2018

Related U.S. Application Data

(63) Continuation-in-part of application No. 15/478,229, filed on Apr. 3, 2017, now Pat. No. 10,457,349, and a continuation-in-part of application No. 15/468,106, filed on Mar. 23, 2017, now abandoned.

(51) Int. Cl.
| | |
|---|---|
| *B62K 3/02* | (2006.01) |
| *B62K 25/28* | (2006.01) |
| *B62J 1/08* | (2006.01) |
| *B62K 25/04* | (2006.01) |

(52) U.S. Cl.
CPC .............. *B62K 25/28* (2013.01); *B62J 1/08* (2013.01); *B62K 3/02* (2013.01); *B62K 25/04* (2013.01)

(58) Field of Classification Search
CPC . B62K 25/28; B62K 3/02; B62K 25/04; B62J 1/08
See application file for complete search history.

(56) References Cited

U.S. PATENT DOCUMENTS

| | | | |
|---|---|---|---|
| 4,596,302 A | 6/1986 | Suzuki et al. | |
| 4,821,833 A | 4/1989 | Yamaguchi | |
| 5,000,470 A | 3/1991 | Kamler et al. | |
| 5,207,619 A | 5/1993 | Klein et al. | |
| 5,284,354 A | 2/1994 | McWethy | |
| 5,360,088 A | 11/1994 | Voss | |

(Continued)

FOREIGN PATENT DOCUMENTS

| | | |
|---|---|---|
| FI | 20150329 A | 5/2017 |
| FR | 2898578 A1 | 9/2007 |

(Continued)

OTHER PUBLICATIONS

Cunningham, Richard, First Ride: Promising New Suspension Design From an Unlikely Source, Feb. 23, 2018, Retrieved from https://www.pinkbike.com/news/first-ride-promising-new-suspension-design-from-an-unlikely-source.html, and https://www.pinkbike.com/u/RichardCunningham/album/Damon-Madsen/ on Feb. 26, 2018.

(Continued)

*Primary Examiner* — Anne Marie M Boehler
*Assistant Examiner* — Marlon A Arce
(74) *Attorney, Agent, or Firm* — Young's Patent Services; Bruce A Young

(57) ABSTRACT

A vehicle includes a forward frame portion with a seat support portion. The vehicle also includes a motion control system and a rear frame portion movably interconnected to the forward frame portion by the motion control system. The motion control system, in response to a forward acceleration of the rear frame portion resulting from a driving force imparted by a wheel supported by the rear frame portion, imparts a force onto the forward frame portion that immediately accelerates the seat support portion in a forward direction.

20 Claims, 9 Drawing Sheets

(56) References Cited

U.S. PATENT DOCUMENTS

| | | | |
|---|---|---|---|
| 5,364,115 A | 11/1994 | Klein et al. | |
| 5,377,734 A | 1/1995 | Klein et al. | |
| 5,385,361 A | 1/1995 | Bei | |
| 5,405,159 A | 4/1995 | Klein et al. | |
| 5,433,465 A | 7/1995 | Klein et al. | |
| 5,452,911 A | 9/1995 | Klein et al. | |
| 5,470,091 A | 11/1995 | Voss et al. | |
| 5,499,864 A | 3/1996 | Klein et al. | |
| 5,509,679 A | 4/1996 | Leitner | |
| 5,517,878 A | 5/1996 | Klein et al. | |
| 5,553,881 A | 9/1996 | Klassen et al. | |
| 5,557,982 A | 9/1996 | Voss et al. | |
| 5,586,780 A | 12/1996 | Klein et al. | |
| 5,611,557 A | 3/1997 | Farris et al. | |
| 5,626,355 A | 5/1997 | Voss et al. | |
| 5,671,936 A * | 9/1997 | Turner | B62K 25/30 280/284 |
| 5,678,837 A | 10/1997 | Leitner | |
| 5,692,764 A | 12/1997 | Klein et al. | |
| 5,743,547 A | 4/1998 | Voss et al. | |
| 5,762,352 A | 6/1998 | Lee | |
| 5,772,228 A * | 6/1998 | Owyang | B62K 25/30 280/284 |
| 5,791,674 A | 8/1998 | D'Aluisio et al. | |
| 5,826,899 A | 10/1998 | Klein et al. | |
| 5,906,385 A | 5/1999 | Voss | |
| 5,944,932 A | 8/1999 | Klein et al. | |
| 5,988,741 A | 11/1999 | Voss et al. | |
| 6,032,971 A | 3/2000 | Herder | |
| 6,109,636 A | 8/2000 | Klein et al. | |
| 6,170,845 B1 | 1/2001 | Tseng | |
| 6,206,396 B1 * | 3/2001 | Smith | B62J 1/06 267/132 |
| 6,361,059 B1 | 3/2002 | Ellsworth | |
| 6,609,722 B1 | 8/2003 | Miyoshi et al. | |
| RE38,669 E | 12/2004 | Voss et al. | |
| 6,848,700 B1 | 2/2005 | Fritschen | |
| 7,048,292 B2 | 5/2006 | Weagle | |
| 7,100,930 B2 | 9/2006 | Saiki | |
| 7,128,329 B2 | 10/2006 | Weagle | |
| 7,147,238 B2 | 12/2006 | Oi | |
| 7,350,787 B2 | 4/2008 | Voss | |
| 7,395,892 B2 | 7/2008 | Alonzo | |
| 7,494,146 B2 | 2/2009 | Tseng | |
| 7,556,276 B1 | 7/2009 | Dunlap | |
| 7,566,066 B2 | 7/2009 | Chang et al. | |
| 7,661,503 B2 | 2/2010 | Weagle | |
| 7,717,212 B2 | 5/2010 | Weagle | |
| 7,722,072 B2 | 5/2010 | Hoogendoom | |
| 7,815,207 B2 | 10/2010 | Currie | |
| 7,828,314 B2 | 11/2010 | Weagle | |
| 7,837,213 B2 | 11/2010 | Colegrove et al. | |
| 8,066,297 B2 | 11/2011 | Beale et al. | |
| 8,272,658 B2 | 9/2012 | Hoogendoom | |
| 8,382,136 B2 | 2/2013 | Beale et al. | |
| 8,622,411 B1 | 1/2014 | Chamberlain | |
| 9,039,026 B2 | 5/2015 | Hudec | |
| 9,242,693 B2 | 1/2016 | Voss | |
| 9,988,122 B2 | 6/2018 | Pedretti | |
| 2002/0180166 A1 | 12/2002 | Voss | |
| 2003/0011167 A1 | 1/2003 | Turner | |
| 2006/0063624 A1 | 3/2006 | Voss | |
| 2006/0064223 A1 | 3/2006 | Voss | |
| 2007/0063476 A1 | 3/2007 | Yu | |
| 2008/0035431 A1 | 2/2008 | Vroomen et al. | |
| 2008/0067772 A1 | 3/2008 | Weagle | |
| 2008/0238030 A1 | 10/2008 | Tseng | |
| 2008/0258517 A1 | 10/2008 | Julliard et al. | |
| 2008/0272560 A1 | 11/2008 | Voss | |
| 2009/0160156 A1 | 6/2009 | Yu | |
| 2009/0315296 A1 | 12/2009 | Berthold | |
| 2009/0322055 A1 | 12/2009 | Arraiz | |
| 2010/0059965 A1 | 3/2010 | Earle | |
| 2011/0233892 A1 * | 9/2011 | Domahidy | B62K 25/286 280/284 |
| 2012/0126506 A1 | 5/2012 | Zawistowski | |
| 2013/0020782 A1 | 1/2013 | Hoogendoom | |
| 2014/0265208 A1 | 9/2014 | Voss | |
| 2014/0265227 A1 | 9/2014 | Voss | |
| 2015/0291244 A1 | 10/2015 | Hsu | |
| 2016/0031521 A1 | 2/2016 | Voss | |
| 2016/0083042 A1 | 3/2016 | Voss | |
| 2016/0368559 A1 | 12/2016 | Voss | |
| 2018/0265165 A1 | 9/2018 | Zawistowski | |
| 2018/0304952 A1 * | 10/2018 | Krugman | B62J 99/00 |
| 2018/0304958 A1 | 10/2018 | Madsen | |

FOREIGN PATENT DOCUMENTS

| | | |
|---|---|---|
| GB | 228382 A | 2/1925 |
| WO | 1995029838 A1 | 11/1995 |
| WO | 2001058748 A1 | 8/2001 |
| WO | 2012024697 | 3/2012 |
| WO | 2014152035 A3 | 12/2014 |
| WO | 2015134538 A1 | 9/2015 |

OTHER PUBLICATIONS

Cunningham, Richard, Polygon Square One EX9 and its R3ACT Suspension—Where it Came From and How it Works, Apr. 12, 2017, Retrieved from https://www.pinkbike.com/news/polygon-square-one-ex9-and-its-r3act-suspension-where-it-came-from-and-how-it-works-2017.html on Feb. 26, 2018.

David Arthur, Suspension stems are back pt2! ShockStop hits Kickstarter target with pivoting suspension stem, Road.CC, Sep. 10, 2015, Farrelly Atkinson Ltd., Bath, United Kingdom, Accessed on the Internet at: http://road.cc/content/news/163688-suspension-stems-are-back-pt2-shockstop-hits-kickstarter-target-pivoting on Aug. 29, 2016.

Rohde, Drew, Elevating More than Chainstays, Mar. 2017, Retrieved from http://www.bluetoad.com/publication/?i=380382&ver=html5&p=90# on May 4, 2017.

Newman, Adam, Exclusive: Dirt Rag test rides new prototype from Chris Currie and Speedgoat Cycles, Dirtrag, Apr. 15, 2015, Retrieved from http://dirtragmag.com/exclusive-dirt-rag-test-rides-new-prototype-from-chris-currie-and-speedgoat-cycles/ on Mar. 4, 2018.

Matt Brett, Suspension stems are back!, Road.CC, Dec. 3, 2014, Farrelly Atkinson Ltd., Bath, United Kingdom, Accessed on the Internet at: http://road.cc/content/news/164555-naild-launches-r3act-suspension-stem-60mm-travel on Aug. 29, 2016.

KIPO, International Search Report for PCT/US2018/023462, dated Jul. 6, 2018.

KIPO, Written Opinion of the International Search Authority for PCT/US2018/023462, dated Jul. 6, 2018.

USPTO, Final Office Action for related U.S. Appl. No. 14/956,274, dated Jul. 5, 2018.

USPTO, Non-Final Office Action for related U.S. Appl. No. 14/956,274, dated Nov. 3, 2017.

USPTO, Non-Final Office Action for related U.S. Appl. No. 14/956,274, dated Dec. 17, 2018.

USPTO, Non-Final Office Action in related U.S. Appl. No. 15/478,229, dated Jun. 27, 2018.

Young, Bruce, Response to Final Office Action for related U.S. Appl. No. 14/956,274, dated Oct. 29, 2018.

Young, Bruce, Response to Non-Final Office Action for related U.S. Appl. No. 14/956,274, dated Mar. 5, 2018.

Young, Bruce, Response to Non-Final Office Action for related U.S. Appl. No. 15/478,229, dated Dec. 19, 2018.

USPTO, Final Office Action for related U.S. Appl. No. 15/478,229, dated Apr. 12, 2019.

Young, Bruce, Response to Non-Final Office Action for related U.S. Appl. No. 14/956,274, dated Feb. 26, 2019.

USPTO Ex-Parte Quayle Action in related U.S. Appl. No, 15/898,545, Feb. 10, 2020.

* cited by examiner

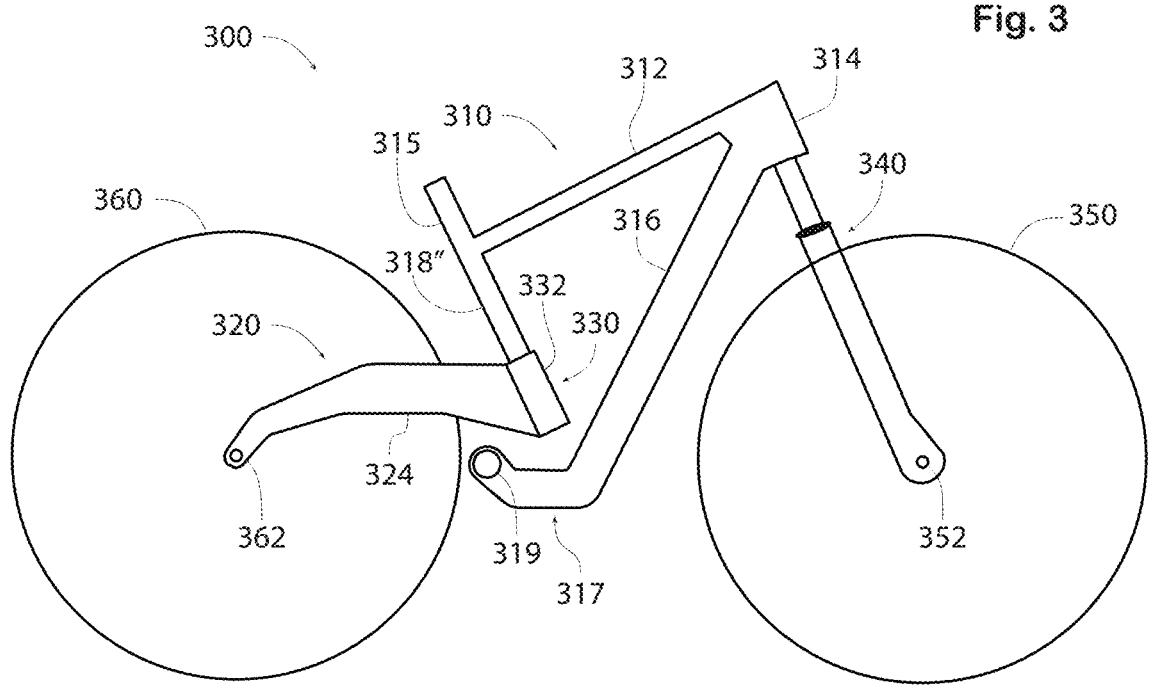
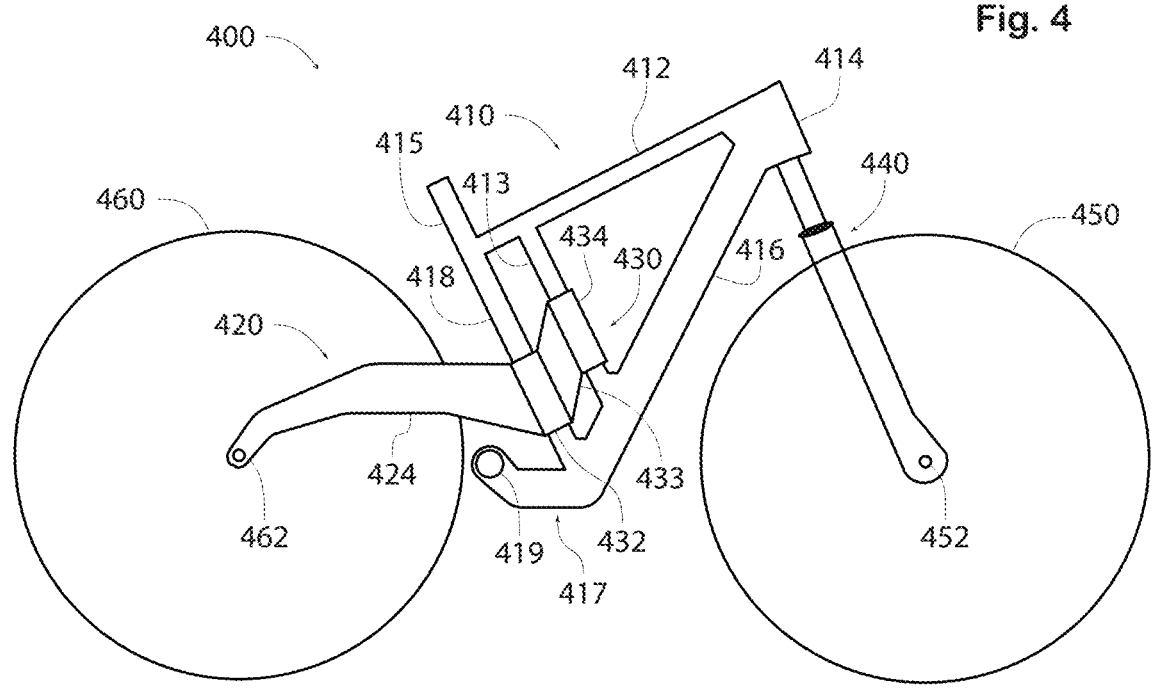

VEHICLE

CROSS-REFERENCE TO RELATED APPLICATIONS

This application claims priority to and benefit under 35 U.S.C. § 120 of the filing date of U.S. non-provisional Utility patent application Ser. No. 15/468,106, filed on Mar. 23, 2017 and priority to and benefit under 35 U.S.C. § 120 of the filing date of U.S. non-provisional Utility patent application Ser. No. 15/478,229, filed on Apr. 3, 2017, the entire disclosure of which applications is herein expressly incorporated by reference.

BACKGROUND OF THE DISCLOSURE

Field of the Disclosure

The present disclosure relates to vehicle, e.g. to a two-wheeled vehicle such as a bicycle.

Description of the Related Art

A large variety of vehicles are known to the prior art. The present disclosure expounds upon this background.

SUMMARY OF THE PRESENT DISCLOSURE

The aim of the present summary is to facilitate understanding of the present disclosure. The summary thus presents concepts and features of the present disclosure in a more simplified form and in looser terms than the detailed description below and should not be taken as limiting other portions of the present disclosure.

Loosely speaking, the present disclosure relates, inter alia, to a bike or e-bike that comprises a forward frame portion and a rear frame portion that are movably interconnected by a motion control system. The motion control system is configured such that, when the rear frame portion is accelerated, e.g. by a driving force of a rear wheel supported by the rear frame portion against the ambient terrain, the motion control system imparts a force onto the forward frame portion that immediately accelerates the seat support portion in the forward direction. By virtue of the movable interconnection of the forward and rear frame portions, the vehicle is able to adequately react to obstacles in the terrain, while the motion control system ensures that a forward acceleration of the rear frame portion invokes an immediate, forward acceleration of the seat support portion, thus allowing the mass of a rider to be appropriately accelerated. The vehicle is thus perceived by the rider as being both supple and responsive.

More specifically, the present disclosure teaches, inter alia, a two-wheeled vehicle, comprising: a forward frame portion comprising a seat support portion; a motion control system; and a rear frame portion movably interconnected to the forward frame portion by said motion control system, wherein the motion control system, in response to a forward acceleration of the rear frame portion resulting from a driving force imparted by a wheel supported by the rear frame portion, imparts a force onto the forward frame portion that immediately accelerates the seat support portion in a forward direction.

Other objects, advantages and embodiments of the present disclosure will become apparent from the detailed description below, especially when considered in conjunction with the accompanying drawings.

BRIEF DESCRIPTION OF THE DRAWINGS

The Figures show:

FIG. 3 a schematic depiction of a third exemplary embodiment of a vehicle in accordance with the present disclosure:

FIG. 4 a schematic depiction of a fourth exemplary embodiment of a vehicle in accordance with the present disclosure:

DETAILED DESCRIPTION

Figure 1:
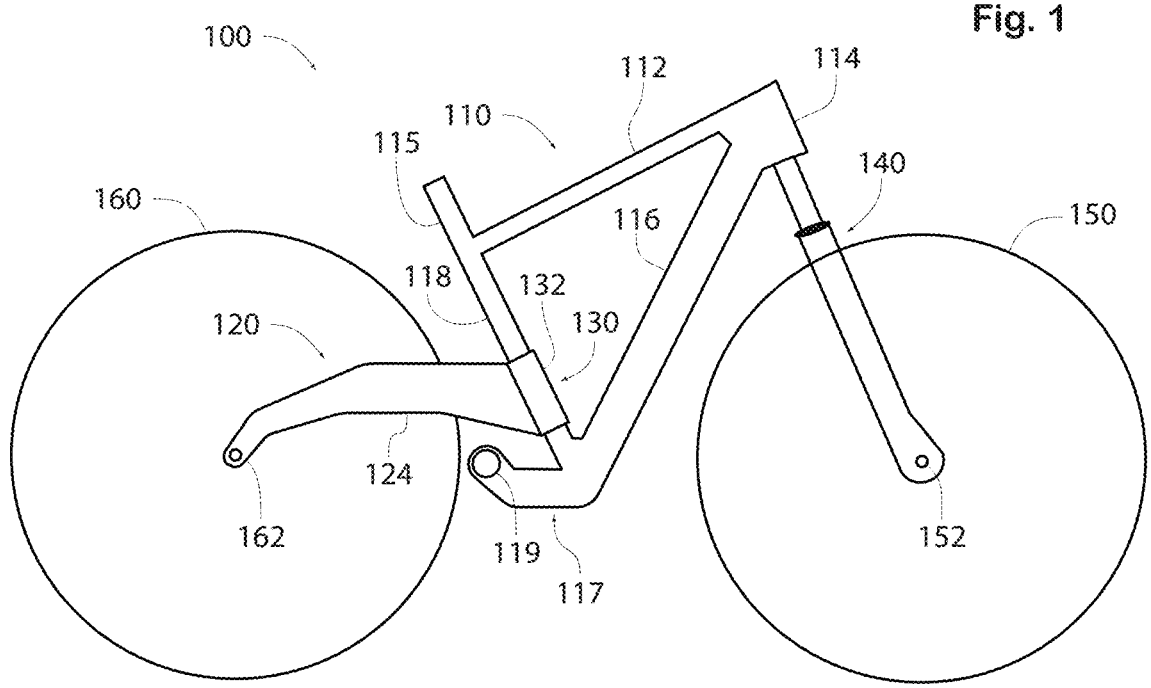
FIG. 1 a schematic depiction of a first exemplary embodiment of a vehicle in accordance with the present disclosure.

The various embodiments of the present disclosure and of the claimed invention, in terms of both structure and operation, will be best understood from the following detailed description, especially when considered in conjunction with the accompanying drawings.

Before elucidating the embodiments shown in the Figures, the various embodiments of the present disclosure will first be described in general terms.

The present disclosure relates to a vehicle. In the context of the present disclosure, a vehicle may be understood as a system (of interacting elements), which system transfers (at least part of) a gravitational force acting on a payload of a vehicle to at least one (propulsive) element that interacts with an ambient environment of the vehicle, e.g. for the sake of providing a propulsive force and/or for the sake of allowing the vehicle to glide/roll over an ambient surface. The payload may include a driver, a rider and/or a passenger of the vehicle. The payload may include an inanimate payload. The ambient surface may be terrain. Similarly, the ambient surface may be a water surface, e.g. a surface of a body of water. The (propulsive) element may be a terrain-engaging element, e.g. a terrain-engaging element selected from the group consisting of a wheel, a skid, a ski and a (continuous) track. Similarly, the (propulsive) element may be a marine (propulsion) element, e.g. an element selected from the group consisting of a float, a hull, a water ski, a jet nozzle and a propeller. For the sake of conciseness, the term "terrain-engaging element" will be used hereinafter to designate any (propulsive) element as described hereinabove, regardless of whether such element is a marine element. (An elucidation of the term "any" is given in the closing paragraphs of this specification.)

The vehicle may comprise at least one terrain-engaging element as described above. The vehicle may be a vehicle selected from the group consisting of a bicycle, an e-bike, a motorcycle, a moped, a (terrestrial) rover, a snowmobile, a snow scooter and a (personal) watercraft. As such, the vehicle may be a vehicle selected from the group consisting of a human-powered vehicle, a (gasoline and/or electric) motor-powered vehicle and a vehicle powered by both human and (gasoline and/or electric) motor power. In the context of the present disclosure, the term "e-bike" may be understood as a bicycle comprising an electrically powered motor that contributes a driving force to at least one wheel of the bicycle.

As evidenced by the remarks above, the specialized nomenclature typically associated with the various vehicles to which the inventive principles of the present disclosure are applicable impairs both the conciseness and overall readability of the present disclosure. Accordingly, the remainder of this disclosure will, in general, use the nomenclature of a bicycle as a contextual basis for the disclosure. This use of bicycle nomenclature is not intended to exclude other types of vehicles from the scope of that disclosure. Instead, it is trusted that the reader can easily transfer the concepts disclosed herein in the context of a bicycle to other vehicles without inventive skills. Accordingly, the following disclosure will also include occasional references to other types of vehicles to aid the read in understanding how the disclosed teachings may be applied to vehicles other than bicycles.

The vehicle may comprise a first frame portion and a second frame portion. The first frame portion may define a first rotational axis, e.g. a rotational axis of a driving sprocket (as opposed to a driven sprocket). For example, the first rotational axis may be a rotational axis of a bottom bracket. Similarly, the first frame portion may comprise a drive train axle support (that defines the first rotational axis). For example, the first frame portion may comprise a bottom bracket and/or a bottom bracket shell (that constitutes the drive train axle support). The first rotational axis/drive train axle support may be located in a lower portion of the first frame portion, e.g. in a lowermost 30%, a lowermost 20%, a lowermost 10% or a lowermost 5% of the first frame portion. (The terms "lower" and "lowermost" are described in further detail infra.) Similarly, the first rotational axis/drive train axle support may be located in a rearward region of the first frame portion, e.g. in a most rearward 30%, a most rearward 20%, a most rearward 10% or a most rearward 5% of (the aforementioned lower(most) portion of) the first frame portion. (The term "rearward" is described in further detail infra.) Such a lower portion and/or rearward region may constitute a bottom bracket region. Similarly, the second frame portion may define a second rotational axis, e.g. a rotational axis of a driven sprocket. For example, the second rotational axis may be a rotational axis of a (second/rear) wheel. Similarly, the second rotational axis may be a (rearmost) rotational axis of a guide of a (continuous) track. The second rotational axis may be located in a rearward region of the second frame portion, e.g. in a most rearward 30%, a most rearward 20%, a most rearward 10% or a most rearward 5% of the second frame portion. Similarly, the second rotational axis may be located in a lower region of the second frame portion, e.g. in a lowermost 30%, a lowermost 20%, a lowermost 10% or a lowermost 5% of (the aforementioned (most) rearward region of) the second frame portion. The first frame portion and/or the second frame portion may comprise at least one (steel, aluminum and/or carbon fiber) tube and/or at least one (steel, aluminum and/or carbon fiber) beam. As such, at least 80%, at least 90% or (substantially) an entirety of the first/second frame portion (by volume and/or by weight) may be a material selected from the group consisting of steel, aluminum and carbon fiber. For example, an entirety of the first/second frame portion may be of such a material except bushings and/or thread elements, e.g. for interconnecting the first/second frame portion with other structures of the vehicle. Such bushings and/or thread elements may demand wear characteristics and/or machining tolerances not achievable with aluminum or carbon fiber.

The first frame portion may constitute a more forward portion of the vehicle component than the second portion. As such, the first frame portion may be termed a "forward frame portion". Similarly, the second frame portion may be termed a "rear frame portion" or a "rearward frame portion". In the present disclosure, "forward" and/or "rear" (as well as related terms such as fore, aft, front and back) may be defined, as known in the art, by an orientation and/or location of a steering wheel and/or handlebars and/or an orientation and/or location of seats (of the vehicle) relative to the vehicle (as a whole). Similarly, "forward" and/or "rear" (and related terms) may be defined, as known in the art, by (other) characteristics of the vehicle. Such characteristics may include a shape of a chassis, a configuration of a drivetrain, etc. For example, the seat may be "forward" of a propulsive terrain-engaging element. A (dominant) direction of propulsion and/or motion of the vehicle may be a "forward" direction. (For the sake of conciseness, the term "propulsion direction" will be used hereinafter to designate the (dominant) direction of the vehicle regardless of whether the vehicle comprises a motor or other means of propulsion). In the present disclosure, "forward" and/or "rear" (and related terms) may designate a (relative) location with respect a "horizontal" axis (when the vehicle is on level terrain). Such designation may be independent of a "vertical" location, i.e. is not to be invariably construed as implying a "vertical" location.

In the present disclosure, "upward" and/or "downward" (as well as related terms such as above, below, upper, higher and lower) may be defined, as known in the art, by an orientation and/or location of seats (of the vehicle) relative to the vehicle (as a whole) and/or a location of a steering wheel and/or handlebars relative to a seat (of the vehicle).

Similarly, "upward" and/or "downward" (and related terms) may be defined, as known in the art, by (other)

characteristics of the vehicle. Such characteristics may include a shape of a chassis, a configuration of a drivetrain, a location of at least one terrain-engaging element as described above, etc. In the present disclosure, "upward" and/or "downward" (and related terms) may designate a (relative) location with respect a "vertical" axis (when the vehicle is on level terrain). Such designation may be independent of a "horizontal" location, i.e. is not to be invariably construed as implying a "horizontal" location.

In the nomenclature of a bicycle, the first frame portion may comprise a seat tube, a top tube, a head tube and a down tube. The first frame portion may have the shape of a quadrilateral. The seat tube, top tube, head tube and down tube may constitute the four sides of the quadrilateral. The seat tube may rigidly connect the top tube and the down tube. Similarly, the seat tube need not rigidly connect the top tube and the down tube. For example, the seat tube may comprise at least one of an upper seat tube portion and a lower seat tube portion. The upper seat tube portion may be (rigidly) connected to the top tube. The lower seat tube portion may be (rigidly) connected to at least one of (a lower region of) the down tube and the drive train axle support. In the case of both an upper seat tube portion and a lower seat tube portion, the upper seat tube portion may lack a direct connection to the lower seat tube portion. As such, the first frame portion may have the shape of a partial quadrilateral. The top tube, head tube and down tube may constitute three sides of the partial quadrilateral and at least one of the upper/lower seat tube portion may constitute a fourth side of the partial quadrilateral. In such a configuration, the top tube, head tube and down tube may (collectively) act as a spring. (For the sake of readability, the term "seat tube" will be used to designate any of the seat tube, the upper seat tube portion and the lower seat tube portion.)

The first frame portion may furthermore comprise a front fork, a steering tube of the front fork being rotatably mounted in the head tube. The first frame portion may comprise a bottom bracket and/or a bottom bracket shell. The bottom bracket (shell) may be located in and/or supported by the bottom bracket region (e.g. as defined supra). The bottom bracket (shell) may be located proximate to and/or rearward of a(n imaginary) junction of the down tube and the seat tube. The first frame portion may comprise comprises a top tube, a bottom bracket region (e.g. as defined supra) and a seat tube that rigidly connects the top tube and the bottom bracket region.

The vehicle may comprise at least one seat, e.g. for at least one user selected from the group consisting of a driver, a rider and a passenger of the vehicle. The seat may be mounted on/rigidly connected to the first frame portion. The seat may lack connection to the second frame portion except via the first frame portion. The seat may be connected to the first frame portion via the seat tube. For example, the seat may be fastened to a seat post. A portion of the seat post may extend inside (and be clamped by) the seat tube.

The first frame portion may comprise a seat support portion. The seat support portion may be located in an upper region of the first frame portion, e.g. in an uppermost 30%, an uppermost 20% or an uppermost 10% of the first frame portion. The seat support portion may be located in rearward region of the first frame portion, e.g. in a most rearward 30%, a most rearward 20%, a most rearward 10% or a most rearward 5% of the first frame portion. The seat support portion may be located at/proximate to an intersection of the seat tube and the top tube. Similarly, the seat support portion may be located at/proximate to an intersection of the upper seat tube portion and the top tube. The seat support portion may support the seat directly. As such, the seat may be mounted on/rigidly connected to the seat support portion. Similarly, the seat support portion may support the seat indirectly. For example, the seat may be mounted on/rigidly connected to a seat post that is mounted/rigidly connected to the seat support portion. A portion of the seat tube, e.g. the upper seat tube portion, may constitute the seat support portion.

The lower seat tube portion may extend from a lower and/or rearward region of the first frame portion in a (general) direction of the seat support portion. For example, the lower seat tube may extend from a lowermost and/or most rearward 30%, a lowermost and/or most rearward 20%, a lowermost and/or most rearward 10% or a lowermost and/or most rearward 5% of the first frame portion. Similarly, the upper seat tube portion may extend from an upper and/or rearward region of the first frame portion in a (general) direction (of a lower region) of the down tube and/or the drive train axle support. For example, the upper seat tube may extend from an uppermost and/or most rearward 30%, an uppermost and/or most rearward 20%, an uppermost and/or most rearward 10% or an uppermost and/or most rearward 5% of the first frame portion. The upper seat tube may extend in a direction of a lowermost 30%, a lowermost 20%, a lowermost 10%, or a lowermost 5% of the down tube.

The second frame portion may comprise/consist (substantially) of a (rear) fork, e.g. a (rear) fork that supports a (rear) wheel of the vehicle. The fork may comprise/consist (substantially) of a first arm, a second arm and a yoke portion. Each of the first and second arms may comprise a dropout, opening or bore (in a rearmost 10% of the respective arm) that receives a (respective) end of an axle (of the wheel). The first and second arms, e.g. the dropouts, openings or bores thereof, may define (a position of) the second rotational axis. The yoke portion may interconnect the first and second arms (at a (respective) forward portion of each of the first and second arms). The fork may comprise a space between the first and second arms that accommodates a (forward) portion of the (rear) wheel (as known in the art). The fork may be a monolithic/unitary structure. The fork may be termed a "swingarm". The fork may constitute an elevated chain stay.

The vehicle may comprise a (power conversion) mechanism for converting (leg and/or arm) motion of a user/rider into mechanical power. The mechanism may comprise a (driving) sprocket. The mechanism may comprise a crankset (that comprises the sprocket) and/or (pivotally mounted) levers (that drive the sprocket). The mechanism may be mounted on the first frame portion, e.g. via the bottom bracket.

The vehicle may comprise a drivetrain, e.g. for transmitting a driving force from the (power conversion) mechanism/the (driving) sprocket to (a driven sprocket connected to) at least one terrain-engaging element (mounted on the second frame portion) of the vehicle. The drivetrain may comprise a chain and/or a belt.

The vehicle may comprise a (gasoline and/or electric) motor. The motor may be located in a lower and/or rearward portion of the first frame portion as described supra. The motor may contribute a driving force to at least one terrain-engaging element of the vehicle, e.g. via the drivetrain. The motor may be mounted on the first frame portion. The drivetrain may transmit a driving force from the motor (mounted on the first frame portion) to (a driven sprocket connected to) at least one terrain-engaging element (mounted on the second frame portion) of the vehicle. Similarly, the motor may be mounted on the second frame portion and provide a driving force to at least one terrain-engaging element mounted on the second frame portion.

The vehicle component may comprise a motion control system, e.g. a motion control system that movably interconnects the first frame portion and the second frame portion. As such, the motion control system may connect the first frame portion and the second frame portion such that the first frame portion is movable (within a limited range of motion defined by the motion control system) relative to the second frame portion (and vice versa).

The motion control system may (be configured and arranged to) impart, in response to a forward acceleration of the second frame portion, a force onto the first frame portion that (immediately) accelerates the seat support portion in a forward direction. Moreover, the motion control system may (be configured and arranged to) impart, in response to a forward acceleration of the second frame portion, a force onto the first frame portion that (immediately) accelerates the seat support portion in a forward direction at an acceleration no less than an acceleration of a drive train axle support (of the first frame portion) in the forward direction. As such, the motion control system may impart the force such that acceleration of the seat support portion does not lag behind/is not less than acceleration of the drive train axle support, e.g. the bottom bracket (shell). The motion control system may (be configured and arranged to) impart, in response to a forward acceleration of the second frame portion, a force onto the first frame portion that (immediately) accelerates the seat support portion in (both a forward and) an upward direction. The forward acceleration of the second frame portion may be a forward acceleration resulting from a (terrain-engaging) driving force imparted by a wheel supported by the second frame portion. The acceleration of the seat support portion may be "immediate" in the sense that the forward acceleration of the second frame portion and the acceleration of the seat support portion commence (essentially) simultaneously (aside from a time lag attributable to machining tolerances/(designed) fitting tolerances of components that (must) interact to impart the force onto the first frame portion and/or to convert forces of the forward acceleration of the second frame portion into the force onto the first frame portion). The acceleration of the seat support portion may be "immediate" in the sense that the motion control system, in response to the forward acceleration of the second frame portion, need not move (relative to the first/second frame portion) to impart the force onto the first frame portion that accelerates the seat support portion (in the forward/upward direction). Moreover, the acceleration of the seat support portion may be "immediate" in the sense that the forward acceleration of the second frame portion will induce a motion (of components) of the motion control system (relative to the first/second frame portion), which motion imparts the force onto the first frame portion, the forward acceleration of the second frame portion, the motion (of components) of the motion control system and the acceleration of the seat support portion commencing (essentially) simultaneously (aside from a time lag attributable to machining tolerances/(designed) fitting tolerances of components that (must) interact to impart the force onto the first frame portion and/or to convert forces of the forward acceleration of the second frame portion into the force onto the first frame portion).

The motion control system may impart the force (onto the first frame portion) in a plurality of operating states of the motion control system. In other words, the motion control system may be capable of imparting the force (onto the first frame portion) in each of a plurality of operating states. The plurality of operating states may include a mid-range position of the motion control system, e.g. a mid-range position as described infra. Similarly, the motion control system may impart the force irrespective of an operating state of said motion control system. In other words, the motion control system may be capable of imparting the force (onto the first frame portion) in any/every operating state (of the motion control system).

Motion of the motion control system may be constrained to a limited range, e.g. by virtue of the construction of the motion control system and/or interaction of the motion control system with at least one of the first frame portion and the second frame portion. Motion of the motion control system may be constrained such that at least one component of the motion control system moves (along a linear or arcuate path) between a (respective) first end-of-range position and a (respective) second end-of-range position. An operating state in which at least one component of the motion control system is halfway between a (respective) first end-of-range position and a (respective) second end-of-range position may constitute/be designated as a mid-range position (of the motion control system), where "halfway" may be determined e.g. as a function of an angle between any two components of the motion control system, as a function of an angle between any component of the motion control system and a portion of the first/second frame portion, and/or as a function of a distance along a (linear/arcuate) path of motion of (the) at least one component of the motion control system. For example, an operating state in which at least one component of the motion control system is (linearly/angularly) halfway along a linear/arcuate path between a (respective) first end-of-range position and a (respective) second end-of-range position may constitute/be designated as a mid-range position (of the motion control system).

In the present disclosure, (minimum) distances, (acute) angles, relative positions, etc. that may depend on a state of the motion control system may be (narrowly) understood as being valid (i.e. measured/determined) when the vehicle is (in an unladen, neutral state) on a level surface (with the terrain-engaging elements of the vehicle contacting the level surface). Moreover, such distances, angles, relative positions, etc. may also be understood as being valid at a mid-range position of the motion control system, e.g. as described supra. Furthermore, such distances, angles, relative locations, etc. may also be broadly understood as being valid throughout the entire operating range of the motion control system.

The motion control system may comprise at least one sliding element, e.g. a component configured to slidingly engage another component (of at least one of the motion control system, the first frame portion and the second frame portion). For example, the sliding element may slidingly engage the seat tube. (As noted above, the term "seat tube" is used to designate any of the seat tube, the upper seat tube portion and the lower seat tube portion for the sake of readability.) In the case of a plurality of sliding elements, the motion control system may comprise at least one intermediate element that (rigidly) connects at least two of the plurality of sliding elements.

The sliding element may be/comprise a tubular structure. The tubular structure may be termed a "sleeve". The sliding element may define a lumen having a constant cross-section relative to a linear/arcuate axis (of the sliding element). The cross-section may be a circular, oval or (rounded) polygonal, e.g. (rounded) rectangular or (rounded) triangular, cross-section. Similarly, the sliding element may be/comprise a cylindrical structure/a structure having a shape of a (partial) cylinder. As such, the sliding element may comprise at least one of an inner wall and an outer wall, the inner/outer wall having a shape of a (partial) cylinder. Moreover, the sliding element may comprise an opening and/or slit. The sliding element may have the shape of a partial cylinder (rather than a cylinder) by virtue of the opening/slit. The (partial) cylinder may have a (partially) circular, oval or (rounded) polygonal, e.g. (rounded) rectangular or (rounded) triangular, cross-section. The sliding element may comprise an outer wall, a surface of the outer wall defining a constant cross-section relative to a linear/arcuate axis (of the sliding element). The cross-section may be a (partially) circular, oval or (rounded) polygonal, e.g. (rounded) rectangular or (rounded) triangular, cross-section.

As stated above, the motion control system may comprise at least one sliding element configured to slidingly engage another component of at least one of the motion control system, the first frame portion and the second frame portion. As such, at least one of the motion control system, the first frame portion and the second frame portion may comprise at least one such another component, e.g. a(n additional) tubular component. The other component may be rigidly connected to the motion control system/first frame portion/second frame portion. For example, the other component may be rigidly connected at least one of a down tube, a seat tube and a bottom bracket region of the first frame portion. Similarly, the other component may be rigidly connected to a rear axle support of the second frame portion.

The sliding element may slidingly engage the aforementioned other component (of at least one of the motion control system, the first frame portion and the second frame portion), e.g. the seat tube, such that the sliding element slides parallel to a linear/arcuate (longitudinal) axis of the other component. For example, the sliding element may comprise a (tubular/generally tubular) structure that (at least partially) encircles/surrounds an outer circumference of the other component. As such, the other component may extend into/through a lumen of the sliding element, e.g. along a longitudinal axis of the sliding element. Moreover, the other component may be (rigidly) connected to (another component of) one of the first frame portion and the second frame portion via an opening/slit (e.g. as described above) in the sliding element. Similarly, the other component may comprise/be a (tubular/generally tubular) structure that (at least partially) encircles/surrounds an outer circumference of the sliding element, e.g. such that the sliding element is free to slide parallel to a linear/arcuate (longitudinal) axis of the other component. The other component may comprise an opening and/or slit. The other component may have the shape of a partial cylinder (rather than a cylinder) by virtue of the opening/slit. The sliding element may be (rigidly) connected to (yet another component of) one of the first frame portion and the second frame portion via the opening/slit (in the other component).

By virtue of the interrelationship of the sliding element and the other component, what is regarded as constituting the sliding element and what is regarded as constituting the other component may be interchangeable. Presuming that such interchangeability will be readily apparent to the skilled reader without explicit mention, this interchangeability will not be consistently highlighted hereinbelow and will instead only find occasional mention for the mere sake of example.

The sliding element may be shaped to slidingly engage the other component in a manner that inhibits rotation of the sliding element in a circumferential direction relative to (a longitudinal axis of) the other component. Similarly, the other component may be shaped to slidingly engage the sliding element in a manner that inhibits rotation of the sliding element in a circumferential direction relative to (a longitudinal axis of) the other component. The sliding element may have an inner shape that, e.g. aside from fitting tolerances, matches an outer shape of the other component. Similarly, the other component may have an inner shape that, e.g. aside from fitting tolerances, matches an outer shape of the sliding element. The motion control system may comprise a plurality of sliding elements, the arrangement and/or interconnection of the plurality of sliding elements inhibiting rotation of the respective sliding element in a circumferential direction relative to (a longitudinal axis of) the respective other component.

The motion control system may be configured such that a forward acceleration of the rear frame portion, e.g. a forward acceleration resulting from a driving force imparted by a wheel supported by the rear frame portion, does not reduce an obstacle-avoiding range of motion of the motion control system. In the present disclosure, the obstacle-avoiding range of motion of the motion control system may be understood as a range of motion available to the motion control system between the (respective, current) operational state (at the time of (initially) encountering a respective obstacle) and a respective end-of-range position (to which the motion control system is constrained as discussed supra), e.g. as the motion control system transitions from the (respective, current) operational state toward the respective end-of-range position in response to a rear wheel of the vehicle encountering the respective obstacle. Similarly, the obstacle-avoiding range of motion of the motion control system may be understood as a distance between the (respective, current) position (of (at least one component) of the motion control system (at the time of (initially) encountering a respective obstacle) and the respective end-of-range position (of (the at least one component of) the motion control system). The encountering of a respective obstacle may impart a force (on the rear wheel that, in turn, imparts a force) on (the rear frame portion at) the second rotational axis in an upward and rearward direction. An acute angle between the force on (the rear frame portion at) the second rotational axis and an imaginary straight line through the first and second rotational axes may be in the range of 20° to 70°, e.g. in the range of 30° to 60° or in the range of 40° to 50°. Moreover, the motion control system may be configured such that (such) a forward acceleration of the rear frame portion increases an obstacle-avoiding range of motion of the motion control system. As such, the motion control system may be configured such that a forward acceleration of the rear frame portion induces a movement of the motion control system toward an end-of-range position opposite the (aforementioned) end-of-range position (toward which the motion control system moves in response to a rear wheel of the vehicle encountering a respective obstacle).

The seat tube and/or the aforementioned other component, which may be the seat tube, may be configured such that an acute angle between a linear/arcuate (longitudinal) axis of the other component and an imaginary straight line through the first and second rotational axes is in the range of 30° to 60°, e.g. in the range of 40° to 50°. More specifically, the seat tube and/or the other component may be configured such that any of a minimum acute angle, an average acute angle and a maximum acute angle between a linear/arcuate (longitudinal) axis of the seat tube/other component and an imaginary straight line through the first and second rotational axes is in the range of 30° to 60°, e.g. in the range of 40° to 50°. In the case of an arcuate (longitudinal) axis, such angles may be measured with respect to a tangent to the arcuate (longitudinal) axis. The seat tube and/or the other component may be configured such that the seat tube/other component slopes downwardly to the front. As such, the seat tube/other component may be configured such that a rearward portion (of a longitudinal axis/tangent to an arcuate axis) of the seat tube/other component is higher than a forward portion of (of the longitudinal axis/tangent to an arcuate axis) the seat tube/other component.

A portion of the sliding element that slidingly engages the aforementioned other component, e.g. the seat tube, may have a length of at least 8 cm, at least 12 cm or at least 16 cm. The length may be measured in a direction/along a path parallel to a linear/arcuate (longitudinal) axis of the other component. The portion of the sliding element that slidingly engages the other component may have a (minimum) diameter of at least 3 cm, at least 6 cm, at least 9 cm or at least 12 cm. The diameter may be measured from a first location on a wall/surface of the sliding element that slidingly engages the other component to a second location on the wall/surface of the sliding element that slidingly engages the other component. The first location may be opposite the second location. For example, the second location may be located at an intersection of the wall/surface and a line that passes through the first location and is perpendicular to a plane tangent to the wall/surface at the first location.

The sliding element may comprise at least one rolling element, e.g. a roller bearing and/or a ball bearing. The rolling element may contact a surface of the aforementioned other component (of at least one of the motion control system, the first frame portion and the second frame portion) slidingly engaged by the sliding element. For example, the rolling element may contact a surface of the seat tube. Similarly, the other component slidingly engaged by the sliding element may comprise at least one rolling element, e.g. a roller bearing and/or a ball bearing. For example, the seat tube may comprise at least one rolling element. The rolling element may contact a surface of the sliding element.

At least 80%, at least 90% or (substantially) an entirety of the sliding element (by volume and/or by weight) may be a material selected from the group consisting of steel, aluminum and carbon fiber. Similarly, at least 80%, at least 90% or (substantially) an entirety of the aforementioned other component (of at least one of the motion control system, the first frame portion and the second frame portion) slidingly engaged by the sliding element (by volume and/or by weight) may be a material selected from the group consisting of steel, aluminum and carbon fiber.

The sliding element may be rigidly connected to a rear axle support of the second frame portion. For example, the sliding element may comprise a tubular structure rigidly connected to the second frame structure, e.g. a(n elevated) chain stay, that comprises the rear axle support. The tubular structure and the rear frame structure may be formed as, i.e. constitute elements of, a unitary (swingarm/chain stay) structure. Similarly, the sliding element may be rigidly connected to at least one of a down tube, a seat tube and a bottom bracket region of the first frame portion.

The motion control system may movably interconnect the first frame portion and the second frame portion such that motion of the second frame portion relative to the first frame portion is restricted to one of a linear and an arcuate path. More specifically, the first frame portion, second frame portion and motion control system may (be configured and arranged to) restrict motion of the second rotational axis to one of a linear and an arcuate path relative to the first frame portion. The linear/arcuate path may be parallel to a linear/arcuate (longitudinal) axis of the sliding element.

The motion control system may movably interconnect the first frame portion and the second frame portion such that motion of the second frame portion relative to the first frame portion is restricted to substantially in-plane motion. For example, motion of the second frame portion relative to the first frame portion may be restricted to a plane orthogonal to the first rotational axis and/or to a plane defined by the top tube and down tube.

Motion of the second frame portion relative to the first frame portion may be restricted (by the motion control system) to such in-plane motion by virtue of a relative shape of the sliding element to the aforementioned other component (of at least one of the motion control system, the first frame portion and the second frame portion) slidingly engaged by the sliding element. As touched upon above, the sliding element may have a (partially) oval or (rounded) polygonal cross-section (that slidingly engages the other component). Similarly, motion of the second frame portion relative to the first frame portion may be restricted (by the motion control system) to such in-plane motion by virtue of (an arrangement of) a plurality of sliding elements (of the motion control system).

The motion control system may comprise at least one linkage that restricts motion of the second frame portion relative to the first frame portion to in-plane motion, e.g. to in-plane motion as described above. The linkage may comprise a plurality of rigid links. A first end portion of a first rigid link of the linkage may be pivotally connected to the first frame portion, and a first end portion of a second rigid link of the linkage may be pivotally connected to the second frame portion. A second end portion of the first rigid link may be pivotally connected to a second end portion of the second rigid link. The motion control system may comprise a plurality of (such) linkages that articulate in parallel.

The motion control system may comprise at least one sheet-shaped component, e.g. a leaf spring, that restricts motion of the second frame portion relative to the first frame portion to in-plane motion, e.g. to in-plane motion as described above. A first edge portion of the sheet-shaped component may be (pivotally) connected to the first frame portion, and a second edge portion of the sheet-shaped component may be (pivotally) connected to (a component of the motion control system rigidly connected to) the second frame portion. The sheet-shaped component may be (substantially) of a material selected from the group consisting of steel and carbon fiber. The sheet-shaped component may resist torsion applied to the sheet-shaped component via the first and second edge portions with a force at least five, at least ten or at least twenty times larger than a force with which the sheet-shaped component resists a bending applied to the sheet-shaped component via the first and second edge portions. In the present context, bending may be understood as a motion of the first edge portion toward the second edge portion (in a direction not coplanar with the sheet-shaped component) without altering an orientation of the first edge portion relative to the second edge portion. In the present context, torsion may be understood as a motion of the first edge portion toward the second edge portion (in a direction not coplanar with the sheet-shaped component) that alters an orientation of the first edge portion relative to the second edge portion.

The motion control system may comprise at least one guide structure, e.g. a rod, that restricts motion of the second frame portion relative to the first frame portion to in-plane motion, e.g. to in-plane motion as described above. The guide structure may guide motion of the sliding element relative to at least one of the first frame portion and the second frame portion. The guide structure may have a longitudinal axis parallel to a longitudinal axis of the sliding element. Similarly, the guide structure may have a longitudinal axis parallel to a longitudinal axis of the other component. The guide structure may constitute (part of) the other component. The motion control system may comprise a plurality of guide structures, a plane through the longitudinal axes of the sliding elements being perpendicular to a plane orthogonal to the first rotational axis. The guide structure may be located inside the other component, e.g. inside the seat tube. Similarly, the guide structure may be located on/fastened to an outer wall of the other component, e.g. to an outer wall of the seat tube. The guide structure may pass through (at least one opening in) the slide element. As such, the guide element may have a length (as measured e.g. along a longitudinal axis of the sliding element) that is at least 100%, at least 150% or at least 200% the length of the sliding element (as measured e.g. along a longitudinal axis of the sliding element).

The opening may be provided in a structure located in a lumen of the slide element. Similarly, the opening may be provided in a structure located on an outer wall of the slide element. The size and/or shape of the opening may correspond (within tolerances) to the size and/or shape of the guide structure, e.g. for the sake of restricting motion of the sliding element to directions parallel to the longitudinal axis of the guide structure. The guide structure may be (substantially) of a material selected from the group consisting of steel, aluminum and carbon fiber.

The various embodiments of the present disclosure having been described above in general terms, the embodiments shown in the Figures will now be elucidated.

FIG. 1 schematically depicts a first exemplary embodiment of a vehicle 100 in accordance with the present disclosure, e.g. as described above.

Figure 9A:
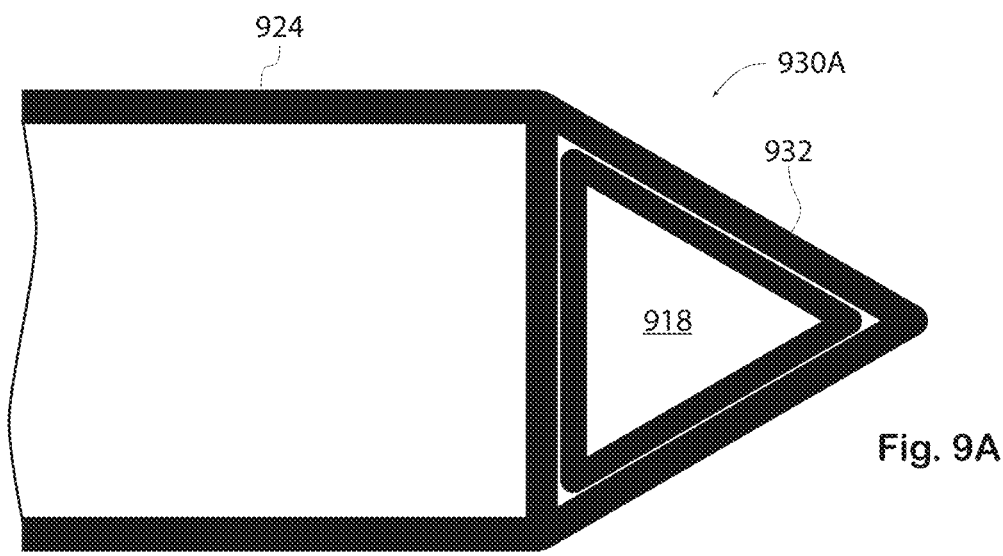
FIG. 9A a schematic, cross-sectional depiction of a first exemplary embodiment of a motion control system in accordance with the present disclosure.
Figure 9B:
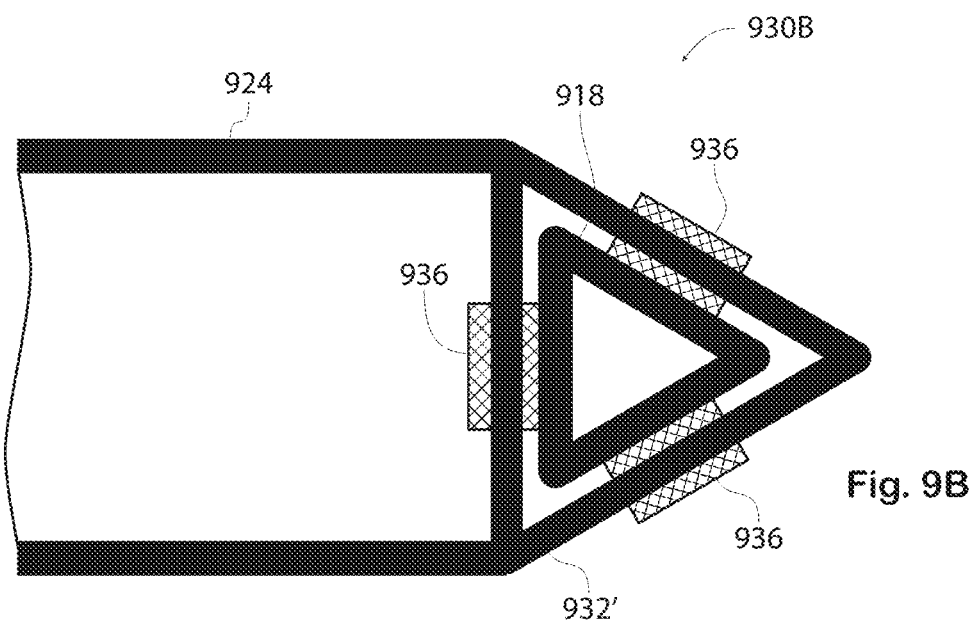
FIG. 9B a schematic, cross-sectional depiction of a second exemplary embodiment of a motion control system in accordance with the present disclosure.

In the illustrated embodiment, vehicle 100 comprises a first frame portion 110, a second frame portion 120, a motion control system 130, a front fork 140, a front wheel 150 and a rear wheel 160. First frame portion 110 comprises a top tube 112, a head tube 114, a down tube 116 and a seat tube 118 in addition to a seat support portion 115, a bottom bracket region 117 and a bottom bracket shell 119 located in and supported by bottom bracket region 117. Second frame portion 120 comprises an elevated chain stay 124 that supports a rear axle 162 of rear wheel 160. Similarly, front fork 140 supports a front axle 152 of front wheel 150. Motion control system 130 comprises a sliding element 132 that encircles an outer circumference of seat tube 118, sliding element 132 thus slidingly engaging seat tube 118 such that sliding element 132 is free to slide parallel to a linear longitudinal axis of seat tube 118. Motion control system 130 may exhibit a cross-section as shown in FIG. 9A or 9B.

As touched upon above, what is regarded as constituting the sliding element and what is regarded as constituting the other component may be interchangeable. Accordingly, in the illustrated embodiment seat tube 118 may be regarded as constituting a sliding element and sliding element 132 may be regarded as constituting the other component.

Figure 2:
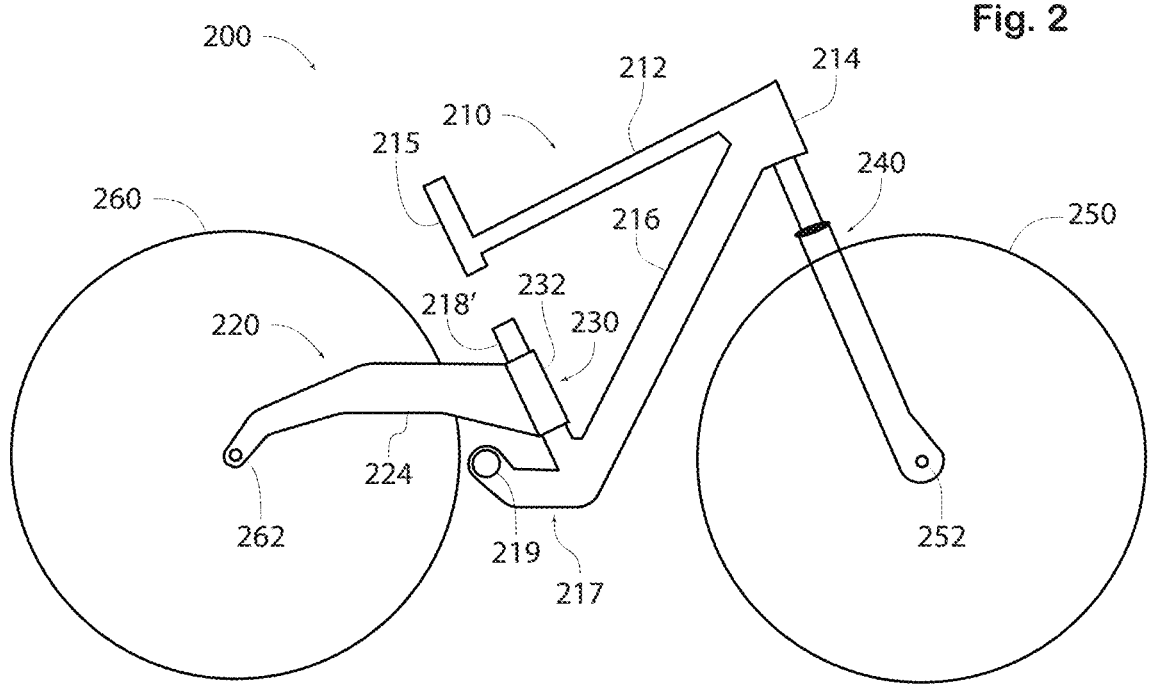
FIG. 2 a schematic depiction of a second exemplary embodiment of a vehicle in accordance with the present disclosure.

FIG. 2 schematically depicts a second exemplary embodiment of a vehicle 200 in accordance with the present disclosure, e.g. as described above.

In the illustrated embodiment, vehicle 200 comprises a first frame portion 210, a second frame portion 220, a motion control system 230, a front fork 240, a front wheel 250 and a rear wheel 260. First frame portion 210 comprises a top tube 212, a head tube 214, a down tube 216 and a lower seat tube portion 218' in addition to a seat support portion 215, a bottom bracket region 217 and a bottom bracket shell 219 located in and supported by bottom bracket region 217. Second frame portion 220 comprises an elevated chain stay 224 that supports a rear axle 262 of rear wheel 260. Similarly, front fork 240 supports a front axle 252 of front wheel 250. Motion control system 230 comprises a sliding element 232 that encircles an outer circumference of lower seat tube portion 218', sliding element 232 thus slidingly engaging lower seat tube portion 218' such that sliding element 232 is free to slide parallel to a linear longitudinal axis of lower seat tube portion 218'. Motion control system 230 may exhibit a cross-section as shown in FIG. 9A or 9B.

FIG. 3 schematically depicts a third exemplary embodiment of a vehicle 300 in accordance with the present disclosure, e.g. as described above.

In the illustrated embodiment, vehicle 300 comprises a first frame portion 310, a second frame portion 320, a motion control system 330, a front fork 340, a front wheel 350 and a rear wheel 360. First frame portion 310 comprises a top tube 312, a head tube 314, a down tube 316 and an upper seat tube portion 318" in addition to a seat support portion 315, a bottom bracket region 317 and a bottom bracket shell 319 located in and supported by bottom bracket region 317. Second frame portion 320 comprises an elevated chain stay 324 that supports a rear axle 362 of rear wheel 360. Similarly, front fork 340 supports a front axle 352 of front wheel 350. Motion control system 330 comprises a sliding element 332 that encircles an outer circumference of upper seat tube portion 318", sliding element 332 thus slidingly engaging upper seat tube portion 318" such that sliding element 332 is free to slide parallel to a linear longitudinal axis of upper seat tube portion 318". Motion control system 330 may exhibit a cross-section as shown in FIG. 9A or 9B.

FIG. 4 schematically depicts a fourth exemplary embodiment of a vehicle 400 in accordance with the present disclosure, e.g. as described above.

In the illustrated embodiment, vehicle 400 comprises a first frame portion 410, a second frame portion 420, a motion control system 430, a front fork 440, a front wheel 450 and a rear wheel 460. First frame portion 410 comprises a top tube 412, a head tube 414, a down tube 416 and a seat tube 418 in addition to a seat support portion 415, a bottom bracket region 417, a bottom bracket shell 419 and an additional tubular component 413. Second frame portion 420 comprises an elevated chain stay 424 that supports a rear axle 462 of rear wheel 460. Similarly, front fork 440 supports a front axle 452 of front wheel 450. Motion control system 430 comprises a first sliding element 432, a second sliding element 434 as well as an intermediate element 433 that rigidly connects first sliding element 432 and second sliding element 434. First sliding element 432 encircles an outer circumference of seat tube 418, first sliding element 432 thus slidingly engaging seat tube 418 such that first sliding element 432 is free to slide parallel to a linear longitudinal axis of seat tube 418. Second sliding element 434 encircles an outer circumference of additional tubular component 413, second sliding element 434 thus slidingly engaging additional tubular component 413 such that second sliding element 434 is free to slide parallel to a linear longitudinal axis of additional tubular component 413. By virtue of (the interconnection provided by) intermediate element 433, a sliding of first sliding element 432 results in a (parallel) sliding of second sliding element 434 (and vice versa).

Figure 5:
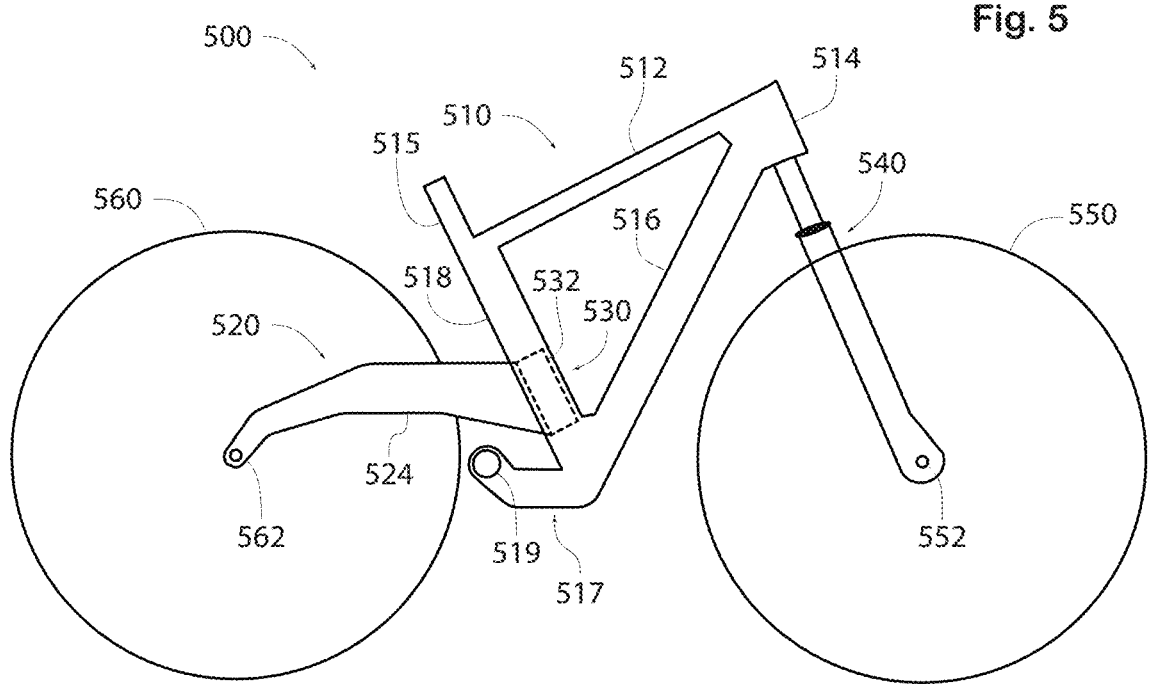
FIG. 5 a schematic depiction of a fifth exemplary embodiment of a vehicle in accordance with the present disclosure.

FIG. 5 schematically depicts a fifth exemplary embodiment of a vehicle 500 in accordance with the present disclosure, e.g. as described above.

Figure 9C:
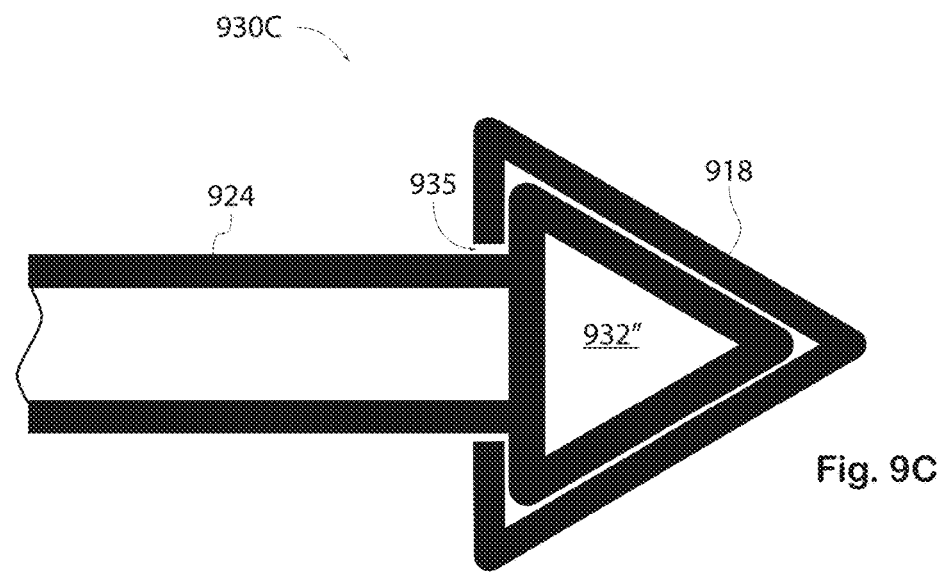
FIG. 9C a schematic, cross-sectional depiction of a third exemplary embodiment of a motion control system in accordance with the present disclosure.
Figure 9D:
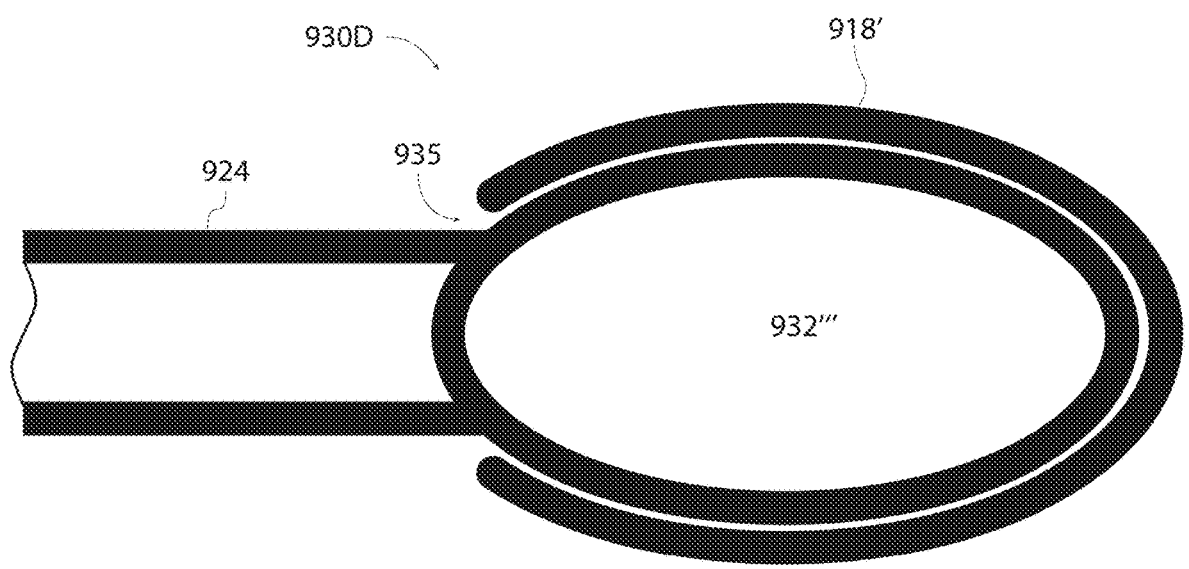
FIG. 9D a schematic, cross-sectional depiction of a fourth exemplary embodiment of a motion control system in accordance with the present disclosure.

In the illustrated embodiment, vehicle 500 comprises a first frame portion 510, a second frame portion 520, a motion control system 530, a front fork 540, a front wheel 550 and a rear wheel 560. First frame portion 510 comprises a top tube 512, a head tube 514, a down tube 516 and a seat tube 518 in addition to a seat support portion 515, a bottom bracket region 517 and a bottom bracket shell 519 located in and supported by bottom bracket region 517. Second frame portion 520 comprises an elevated chain stay 524 that supports a rear axle 562 of rear wheel 560. Similarly, front fork 540 supports a front axle 552 of front wheel 550. Motion control system 530 comprises a sliding element 532 that is rigidly connected to elevated chain stay 524. As reflected by the dashed representation of sliding element 532 (that indicates sliding element 532 is hidden from view), seat tube 518 partially encircles and slidingly engages sliding element 532 such that sliding element 532 is free to slide parallel to a linear longitudinal axis of seat tube 518. Motion control system 530 may exhibit a cross-section as shown in FIG. 9C or 9D.

Figure 6:
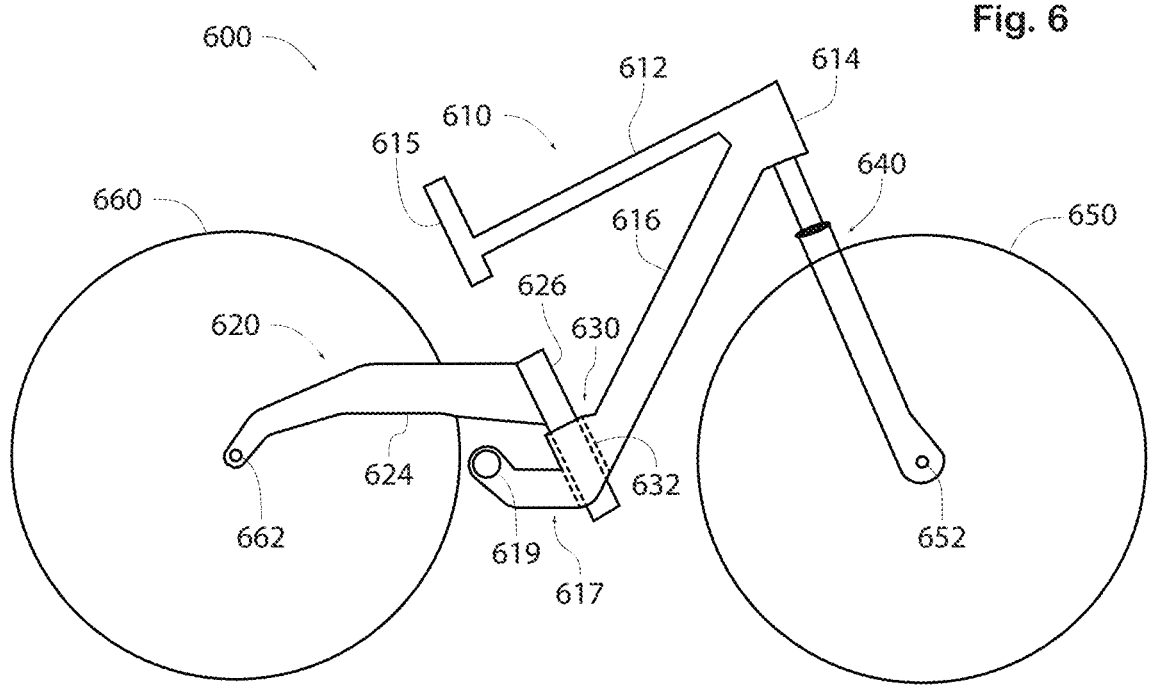
FIG. 6 a schematic depiction of a sixth exemplary embodiment of a vehicle in accordance with the present disclosure.

FIG. 6 schematically depicts a sixth exemplary embodiment of a vehicle 600 in accordance with the present disclosure, e.g. as described above.

In the illustrated embodiment, vehicle 600 comprises a first frame portion 610, a second frame portion 620, a motion control system 630, a front fork 640, a front wheel 650 and a rear wheel 660. First frame portion 610 comprises a top tube 612, a head tube 614 and a down tube 616 in addition to a seat support portion 615, a bottom bracket region 617 and a bottom bracket shell 619 located in and supported by bottom bracket region 617. Second frame portion 620 comprises a tubular structure 626 and an elevated chain stay 624 rigidly connected to tubular structure 626, elevated chain stay 624 supporting a rear axle 662 of rear wheel 660. Similarly, front fork 640 supports a front axle 652 of front wheel 650. Motion control system 630 comprises a tubular sliding element 632 that, as reflected by the dashed representation of an inner surface of the tubular sliding element 632 (that indicates the inner surface of the tubular sliding element 632 is hidden from view), extends through and is rigidly connected to first frame portion 610 at a junction of down tube 616 and bottom bracket region 617. Tubular structure 626 of second frame portion 620 extends into tubular sliding element 632, tubular sliding element 632 encircling a portion of tubular structure 626 such that tubular sliding element 632 is free to slide parallel to a linear longitudinal axis of tubular structure 626.

As touched upon above, what is regarded as constituting the sliding element and what is regarded as constituting the other component may be interchangeable. Accordingly, in the illustrated embodiment tubular structure 626 may be regarded as constituting a sliding element and tubular sliding element 632 may be regarded as constituting the other component.

Figure 7:
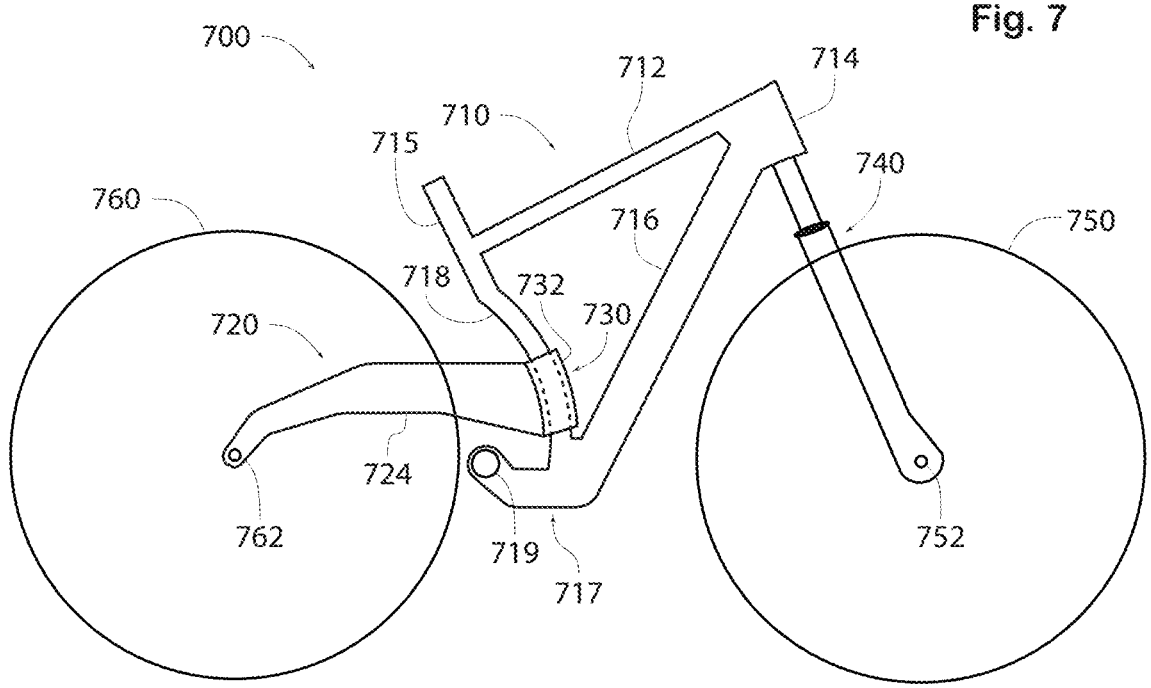
FIG. 7 a schematic depiction of a seventh exemplary embodiment of a vehicle in accordance with the present disclosure.

FIG. 7 schematically depicts a seventh exemplary embodiment of a vehicle 700 in accordance with the present disclosure, e.g. as described above.

In the illustrated embodiment, vehicle 700 comprises a first frame portion 710, a second frame portion 720, a motion control system 730, a front fork 740, a front wheel 750 and a rear wheel 760. First frame portion 710 comprises a top tube 712, a head tube 714, a down tube 716 and an arcuate seat tube 718 in addition to a seat support portion 715, a bottom bracket region 717 and a bottom bracket shell 719 located in and supported by bottom bracket region 717. Second frame portion 720 comprises an elevated chain stay 724 that supports a rear axle 762 of rear wheel 760. Similarly, front fork 740 supports a front axle 752 of front wheel 750. Motion control system 730 comprises an arcuate sliding element 732 that encircles an outer circumference of arcuate seat tube 718, arcuate sliding element 732 thus slidingly engaging arcuate seat tube 718 such that arcuate sliding element 732 is free to slide parallel to an arcuate longitudinal axis of arcuate seat tube 718. Motion control system 730 may exhibit a cross-section as shown in FIG. 9A or 9B.

Figure 8:
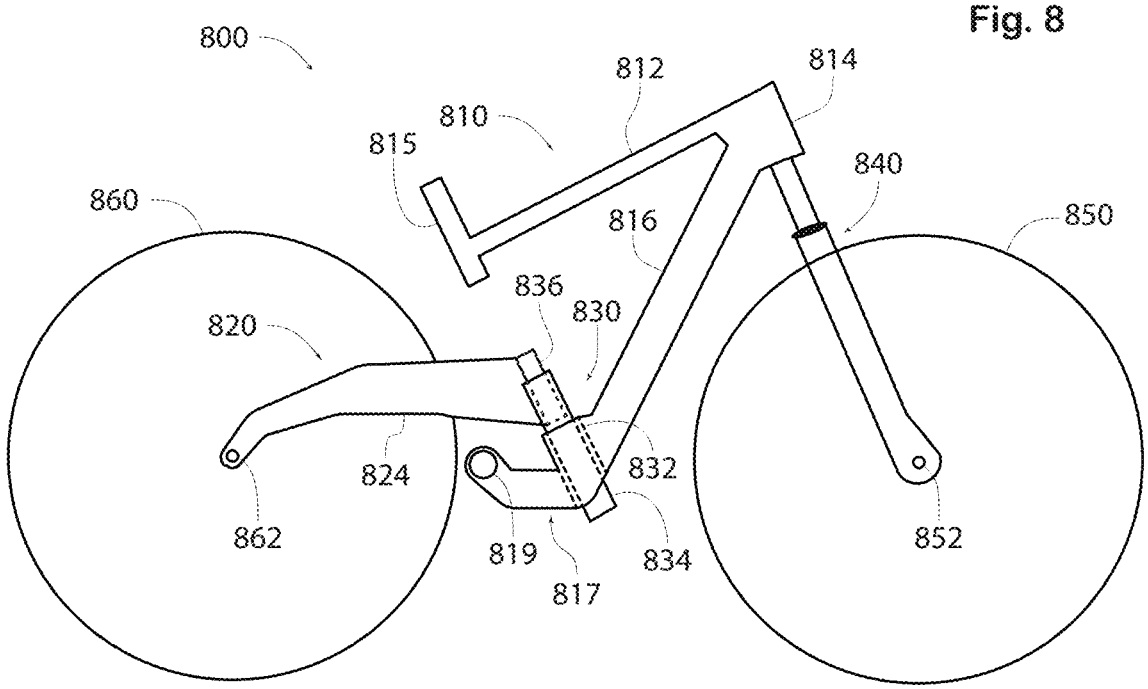
FIG. 8 a schematic depiction of an eighth exemplary embodiment of a vehicle in accordance with the present disclosure.

FIG. 8 schematically depicts an eighth exemplary embodiment of a vehicle 800 in accordance with the present disclosure, e.g. as described above.

In the illustrated embodiment, vehicle 800 comprises a first frame portion 810, a second frame portion 820, a motion control system 830, a front fork 840, a front wheel 850 and a rear wheel 860. First frame portion 810 comprises a top tube 812, a head tube 814 and a down tube 816 in addition to a seat support portion 815, a bottom bracket region 817 and a bottom bracket shell 819 located in and supported by bottom bracket region 817. Second frame portion 820 comprises an elevated chain stay 824 that supports a rear axle 862 of rear wheel 860. Similarly, front fork 840 supports a front axle 852 of front wheel 850.

Motion control system 830 comprises a first sliding element 832, a second sliding element 834 and a third sliding element 836. As reflected by the dashed representation of an inner surface of the first sliding element 832 (that indicates the inner surface of the first sliding element 832 is hidden from view), first sliding element 832 extends through and is rigidly connected to first frame portion 810 at a junction of down tube 816 and bottom bracket region 817. In turn, third sliding element 836 is rigidly connected to elevated chain stay 824. Second sliding element 834 extends into first sliding element 832, first sliding element 832 encircling a segment of second sliding element 834 such that second sliding element 834 is free to slide parallel to a linear longitudinal axis of first sliding element 832. Similarly, third sliding element 836 extends into second sliding element 834, second sliding element 834 partially encircling a segment of third sliding element 836 such that third sliding element 836 is free to slide parallel to a linear longitudinal axis of second sliding element 834. At the interface of second sliding element 834 and third sliding element 836, motion control system 830 may exhibit a cross-section as shown in FIG. 9C or 9D.

FIG. 9A schematically depicts, in cross-section, a first exemplary embodiment of a motion control system 930A in accordance with the present disclosure, e.g. as described above.

In the illustrated embodiment, motion control system 930A comprises a sliding element 932 in the form of a triangular tubular structure that is rigidly connected to a component 924, e.g. an elevated chain stay, of a second frame portion of a vehicle. Sliding element 932 is shaped to closely encircle an outer circumference of a triangular component 918, e.g. a seat tube, of a first frame portion of the vehicle, a narrow gap between an inner wall of sliding element 932 and an outer circumference of component 918 inhibiting rotation of sliding element 932 in a circumferential direction relative to a longitudinal axis of component 918, e.g. inhibiting rotation of sliding element 932 in a clockwise or counterclockwise direction in the plane of the drawing sheet around component 918, while permitting a sliding motion of sliding element 932 relative to component 918 parallel to a longitudinal axis of component 918, e.g. permitting a sliding motion of sliding element 932 relative to component 918 in a direction perpendicular to the plane of the drawing sheet.

FIG. 9B schematically depicts, in cross-section, a second exemplary embodiment of a motion control system 930B in accordance with the present disclosure, e.g. as described above.

In the illustrated embodiment, motion control system 930B comprises a sliding element 932' in the form of a triangular tubular structure that is rigidly connected to a component 924, e.g. an elevated chain stay, of a second frame portion of a vehicle. Sliding element 932' comprises a plurality of roller bearings 936 that rotatably contact an outer wall of a triangular component 918, e.g. a seat tube, of a first frame portion of the vehicle. The interaction of the roller bearings 936 and component 918 inhibits rotation of sliding element 932' in a circumferential direction relative to a longitudinal axis of component 918, e.g. inhibiting rotation of sliding element 932' in a clockwise or counterclockwise direction in the plane of the drawing sheet around component 918, while permitting a sliding motion of sliding element 932' relative to component 918 parallel to a longitudinal axis of component 918, e.g. permitting a sliding motion of sliding element 932' relative to component 918 in a direction perpendicular to the plane of the drawing sheet.

FIG. 9C schematically depicts, in cross-section, a third exemplary embodiment of a motion control system 930C in accordance with the present disclosure, e.g. as described above.

In the illustrated embodiment, motion control system 930C comprises a sliding element 932" in the form of a triangular tube. An outer circumference of sliding element 932" is closely, albeit only partially, encircled by the (generally triangular) inner wall of (another) component 918, e.g. a seat tube, of a first frame portion of the vehicle. Sliding element 932" is rigidly connected to a component 924, e.g. an elevated chain stay, of a second frame portion of a vehicle, via an opening 935 in (other) component 918. A narrow gap between the outer circumference of sliding element 932" and the inner wall of (other) component 918 inhibits rotation of sliding element 932" in a circumferential direction relative to a longitudinal axis of component 918, e.g. inhibiting rotation of sliding element 932" in a clockwise or counterclockwise direction in the plane of the drawing sheet inside component 918, while permitting a sliding motion of sliding element 932" relative to component 918 parallel to a longitudinal axis of component 918, e.g. permitting a sliding motion of sliding element 932" relative to component 918 in a direction perpendicular to the plane of the drawing sheet.

FIG. 9D schematically depicts, in cross-section, a fourth exemplary embodiment of a motion control system 930D in accordance with the present disclosure, e.g. as described above.

In the illustrated embodiment, motion control system 930D comprises a sliding element 932''' in the form of an oval structure. An outer circumference of sliding element 932''' is closely, albeit only partially, encircled by an inner wall of a partially oval component 918', e.g. a seat tube, of a first frame portion of the vehicle. Sliding element 932''' is rigidly connected to a component 924, e.g. an elevated chain stay, of a second frame portion of a vehicle, via an opening 935 in oval component 918'. A narrow gap between an inner wall of oval component 918' and an outer circumference of sliding element 932''' inhibits rotation of sliding element 932''' in a circumferential direction relative to a longitudinal axis of component 918', e.g. inhibiting rotation of sliding element 932''' in a clockwise or counterclockwise direction in the plane of the drawing sheet within component 918', while permitting a sliding motion of sliding element 932''' relative to component 918' parallel to a longitudinal axis of component 918', e.g. permitting a sliding motion of sliding element 932''' relative to component 918' in a direction perpendicular to the plane of the drawing sheet.

Figure 10:
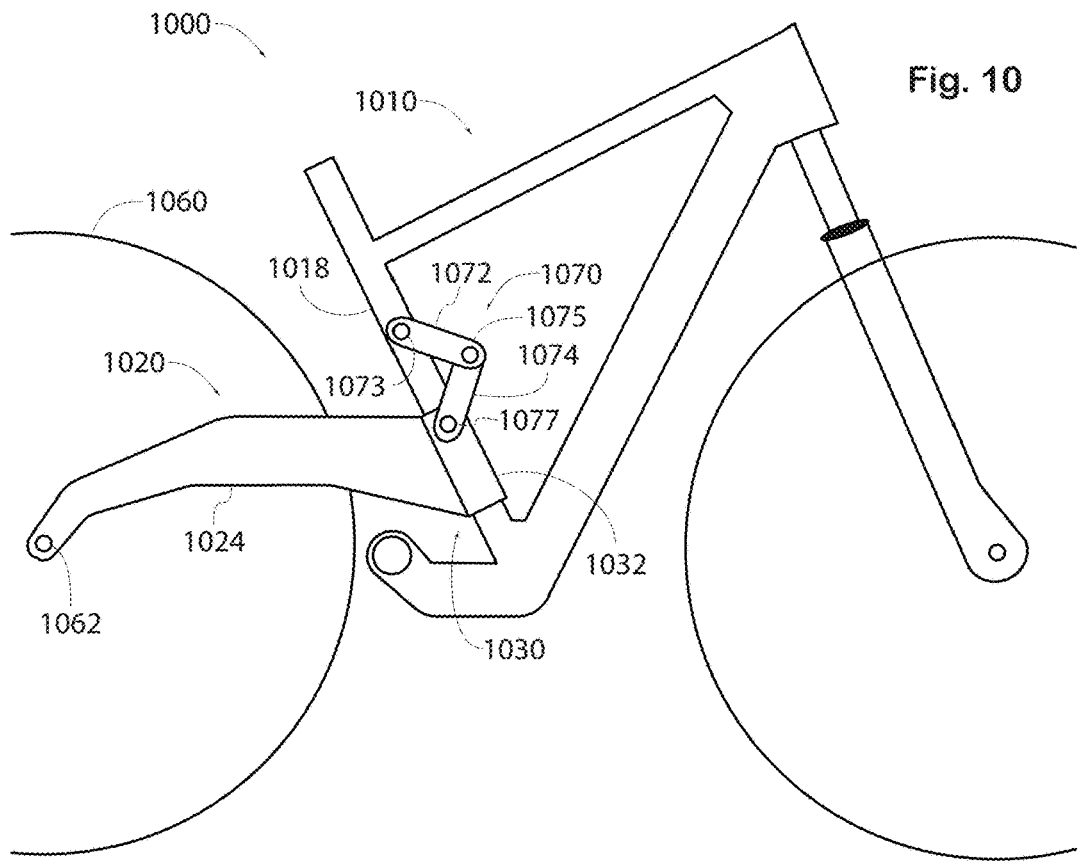
FIG. 10 a schematic depiction of a ninth exemplary embodiment of a vehicle in accordance with the present disclosure.

FIG. 10 schematically depicts an ninth exemplary embodiment of a vehicle 1000 in accordance with the present disclosure, e.g. as described above.

In the illustrated embodiment, vehicle 1000 comprises, inter alia, a first frame portion 1010, a second frame portion 1020, a motion control system 1030 and a rear wheel 1060. First frame portion 1010 comprises, inter alia, a seat tube 1018. Second frame portion 1020 comprises an elevated chain stay 1024 that supports a rear axle 1062 of rear wheel 1060.

Motion control system 1030 comprises a sliding element 1032 that encircles an outer circumference of seat tube 1018, sliding element 1032 thus slidingly engaging seat tube 1018 such that sliding element 1032 is free to slide parallel to a linear longitudinal axis of seat tube 1018. Sliding element 1032 is rigidly connected to elevated chain stay 1024. Motion control system 1030 moreover comprises a linkage 1070 that restricts motion of second frame portion 1020 relative to first frame portion 1010 to in-plane motion. The linkage 1070 may be referred to as an anti-rotational structure. In the illustrated embodiment, linkage 1070 comprises a first rigid link 1072 and a second rigid link 1074. A first end portion of first rigid link 1072 is pivotally connected to first frame portion 1010, viz. to seat tube 1018, by means of a first pivotal connection 1073. A second end portion of first rigid link 1072 is pivotally connected to a first end portion of second rigid link 1074 by means of a second pivotal connection 1075. A second end portion of second rigid link 1074 is pivotally connected to sliding element 1032 by means of a third pivotal connection 1077.

Vehicle 1000 is shown as having linkage 1070 on the right-hand side of vehicle 1000.

Linkage 1070 may be provided on the left-hand side of vehicle 1000. Similarly, vehicle 1000 may comprise such a linkage on each of the right- and left-hand sides of vehicle 1000. The two linkages may articulate in parallel.

Figure 11:
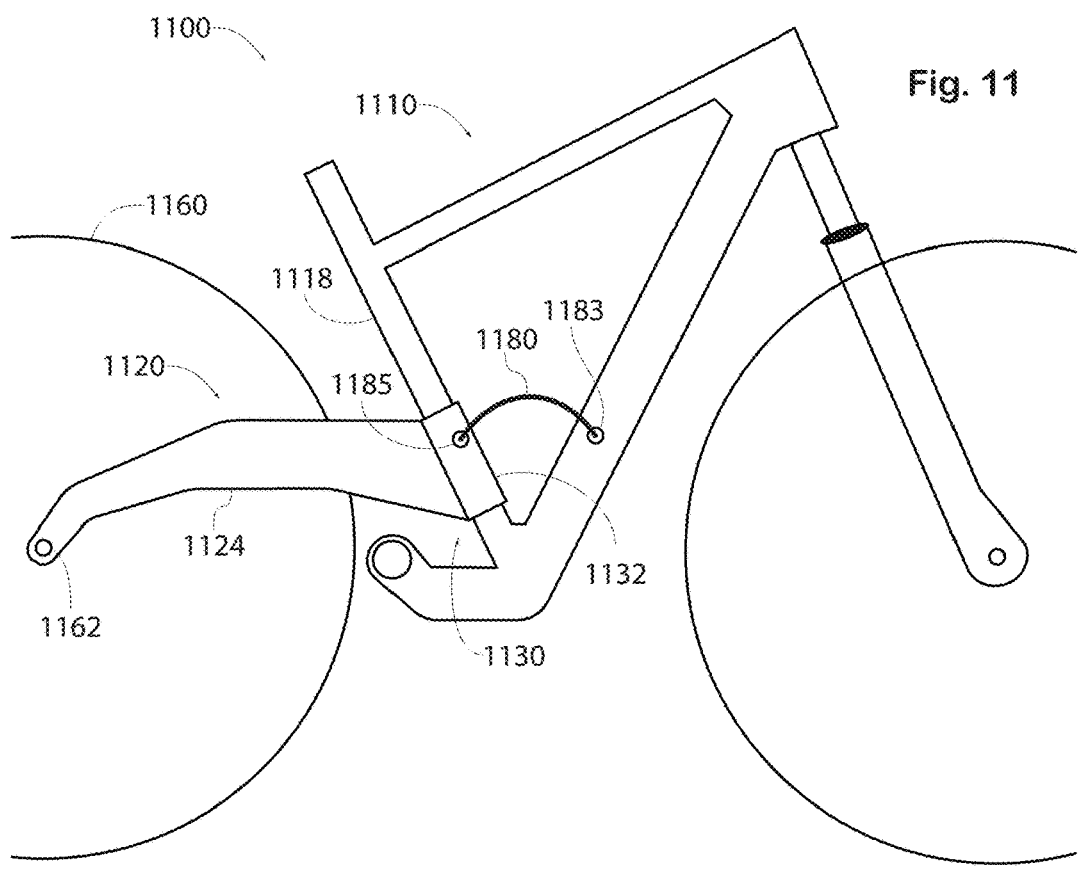
FIG. 11 a schematic depiction of a tenth exemplary embodiment of a vehicle in accordance with the present disclosure.

FIG. 11 schematically depicts a tenth exemplary embodiment of a vehicle 1100 in accordance with the present disclosure, e.g. as described above.

In the illustrated embodiment, vehicle 1100 comprises, inter alia, a first frame portion 1110, a second frame portion 1120, a motion control system 1130 and a rear wheel 1160. First frame portion 1110 comprises, inter alia, a seat tube 1118. Second frame portion 1120 comprises an elevated chain stay 1124 that supports a rear axle 1162 of rear wheel 1160.

Motion control system 1130 comprises a sliding element 1132 that encircles an outer circumference of seat tube 1118, sliding element 1132 thus slidingly engaging seat tube 1118 such that sliding element 1132 is free to slide parallel to a linear longitudinal axis of seat tube 1118. Motion control system 1130 moreover comprises sheet-shaped component 1180 that restricts motion of second frame portion 1120 relative to first frame portion 1110 to in-plane motion. The sheet-shaped component 1180 may be referred to as an anti-rotational structure. A first edge portion of sheet-shaped component 1180 is pivotally connected to the first frame portion 1110 by means of a first pivotal connection 1183, and a second edge portion of sheet-shaped component 1180 is pivotally connected to sliding element 1132 by means of a second pivotal connection 1085. Sliding element 1132 is rigidly connected to second frame portion 1120, viz. to elevated chain stay 1124.

Figure 12A:
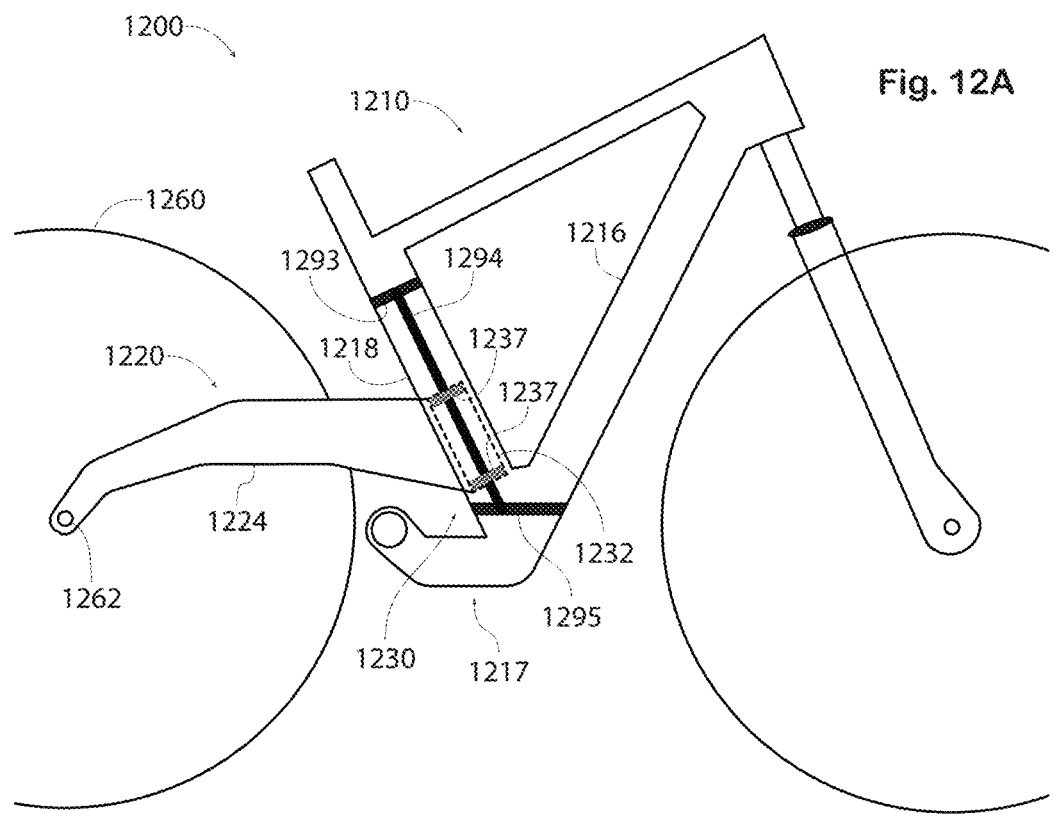
FIG. 12A a schematic depiction of an eleventh exemplary embodiment of a vehicle in accordance with the present disclosure.

FIG. 12A schematically depicts an eleventh exemplary embodiment of a vehicle 1200 in accordance with the present disclosure, e.g. as described above.

In the illustrated embodiment, vehicle 1200 comprises, inter alia, a first frame portion 1210, a second frame portion 1220, a motion control system 1230 and a rear wheel 1260.

First frame portion 1210 comprises, inter alia, a down tube 1216 and a seat tube 1218 in addition to a bottom bracket region 1217. Second frame portion 1220 comprises an elevated chain stay 1224 that supports a rear axle 1262 of rear wheel 1260.

Motion control system 1230 comprises a sliding element 1232 that is rigidly connected to elevated chain stay 1224. As reflected by the dashed representation of sliding element 1232 (that indicates sliding element 1232 is hidden from view), seat tube 1218 partially encircles and slidingly engages sliding element 1232 such that sliding element 1232 is free to slide parallel to a linear longitudinal axis of seat tube 1218.

Motion control system 1230 moreover comprises a rod-shaped guide structure 1294 that restricts motion of second frame portion 1220 relative to first frame portion 1210 to in-plane motion. The rod-shaped guide structure 1294 may be referred to as an anti-rotational structure. Although not depicted in dashed lines for the sake of better visibility, guide structure 1294 is located inside seat tube 1218, a first end of guide structure 1294 being supported by a first support structure 1293 inside an upper region of seat tube 1218 and a second end of guide structure 1294 being supported by a second support structure 1295 inside first frame portion 1210, roughly at a junction of seat tube 1218, down tube 1216 and bottom bracket region 1217. Guide structure 1294 passes through a lumen of sliding element 1232. More specifically, guide structure 1294 passes through a respective opening in each of structures 1237, one such structure 1237 being provided in an upper region of the lumen of sliding element 1232, another such structure 1237 being provided in a lower region of the lumen of sliding element 1232.

Figure 12B:
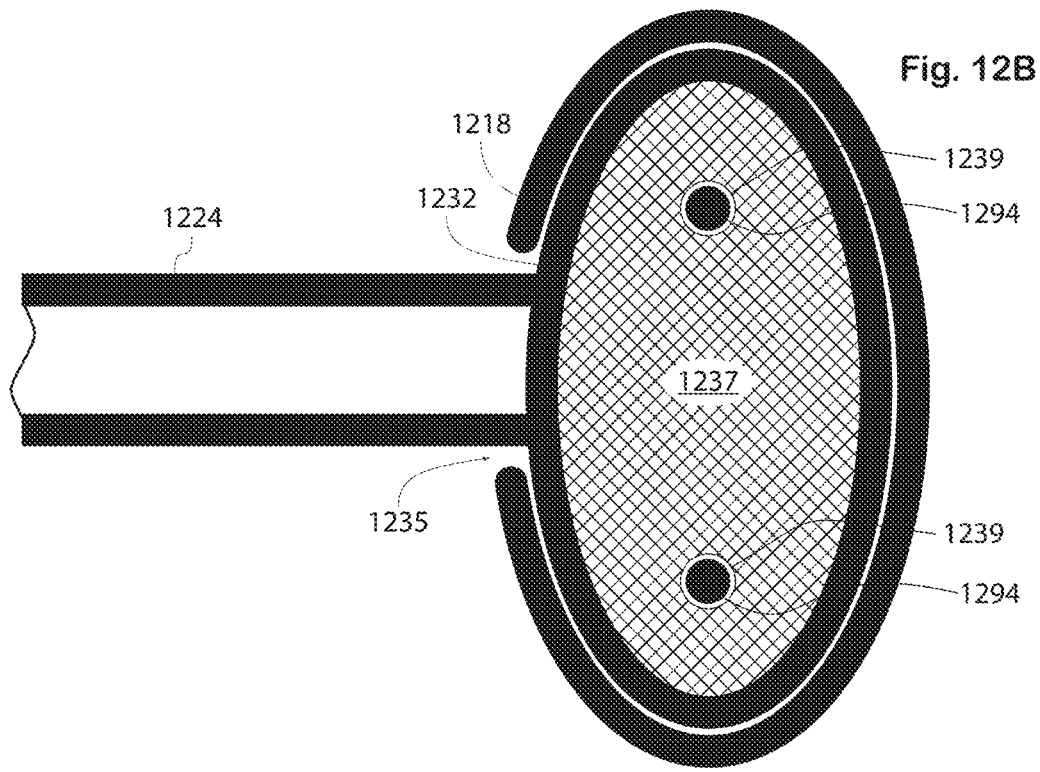
FIG. 12B a schematic, cross-sectional depiction of the motion control system of FIG. 12A.

FIG. 12B schematically depicts a cross-section of motion control system 1230 of FIG. 12A.

As shown in the Figure, sliding element 1232 has an oval shaped cross-section. An outer circumference of sliding element 1232 is closely, albeit only partially, encircled by an inner wall of seat tube 1218 that has a partially oval shaped cross-section. Sliding element 1232 is rigidly connected to elevated chain stay 1234 via an opening 1235 in seat tube 1218. A narrow gap between an inner wall of seat tube 1218 and an outer circumference of sliding element 1232 inhibits rotation of sliding element 1232 in a circumferential direction relative to a longitudinal axis of seat tube 1218. Rotation of sliding element 1232 in a circumferential direction relative to a longitudinal axis of seat tube 1218 is moreover inhibited by the two rod-shaped guide structures 1294 that pass through respective openings 1239 in structure 1237 located in a lumen of sliding element 1232.

Figure 13A:
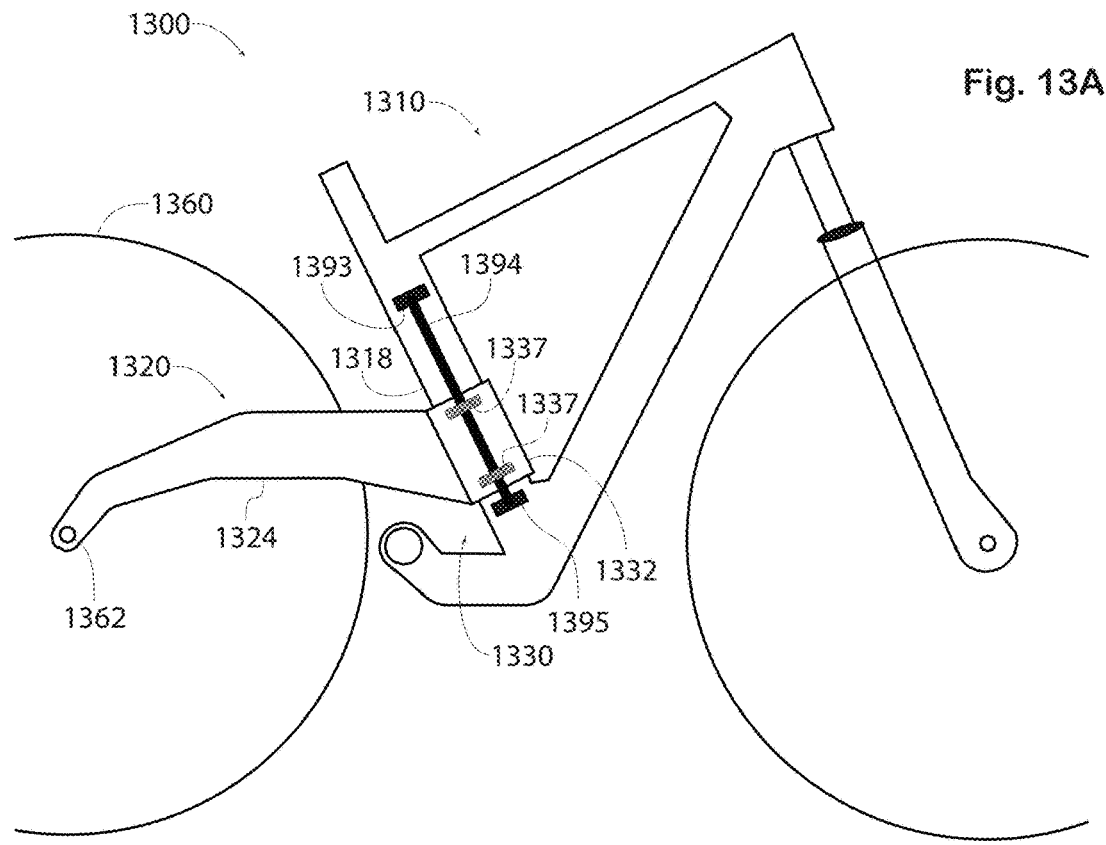
FIG. 13A a schematic depiction of a twelfth exemplary embodiment of a vehicle in accordance with the present disclosure.

FIG. 13A schematically depicts a twelfth exemplary embodiment of a vehicle 1300 in accordance with the present disclosure, e.g. as described above.

In the illustrated embodiment, vehicle 1300 comprises, inter alia, a first frame portion 1310, a second frame portion 1320, a motion control system 1330 and a rear wheel 1360. First frame portion 1310 comprises, inter alia, a seat tube 1318. Second frame portion 1320 comprises an elevated chain stay 1324 that supports a rear axle 1362 of rear wheel 1360.

Motion control system 1330 comprises a sliding element 1332 that is rigidly connected to elevated chain stay 1324. Sliding element 1332 encircles an outer circumference of seat tube 1318, sliding element 1332 thus slidingly engaging seat tube 1318 such that sliding element 1332 is free to slide parallel to a linear longitudinal axis of seat tube 1318.

Motion control system 1330 moreover comprises a rod-shaped guide structure 1394 that restricts motion of second frame portion 1320 relative to first frame portion 1310 to in-plane motion. The rod-shaped guide structure 1394 may be referred to as an anti-rotational structure. Guide structure 1394 is fastened to an outer wall of seat tube 1318, a first end of guide structure 1394 being fastened to the outer wall of seat tube 1318 by a first support structure 1393 at an upper region of seat tube 1318 and a second end of guide structure 1394 being fastened to the outer wall of seat tube 1318 by a second support structure 1395 at an lower region of seat tube 1318. Guide structure 1394 passes through a respective opening in each of structures 1337, one such structure 1337 being located in an upper region on an outer wall of sliding element 1332, another such structure 1337 located in a lower region on an outer wall of sliding element 1332.

Figure 13B:
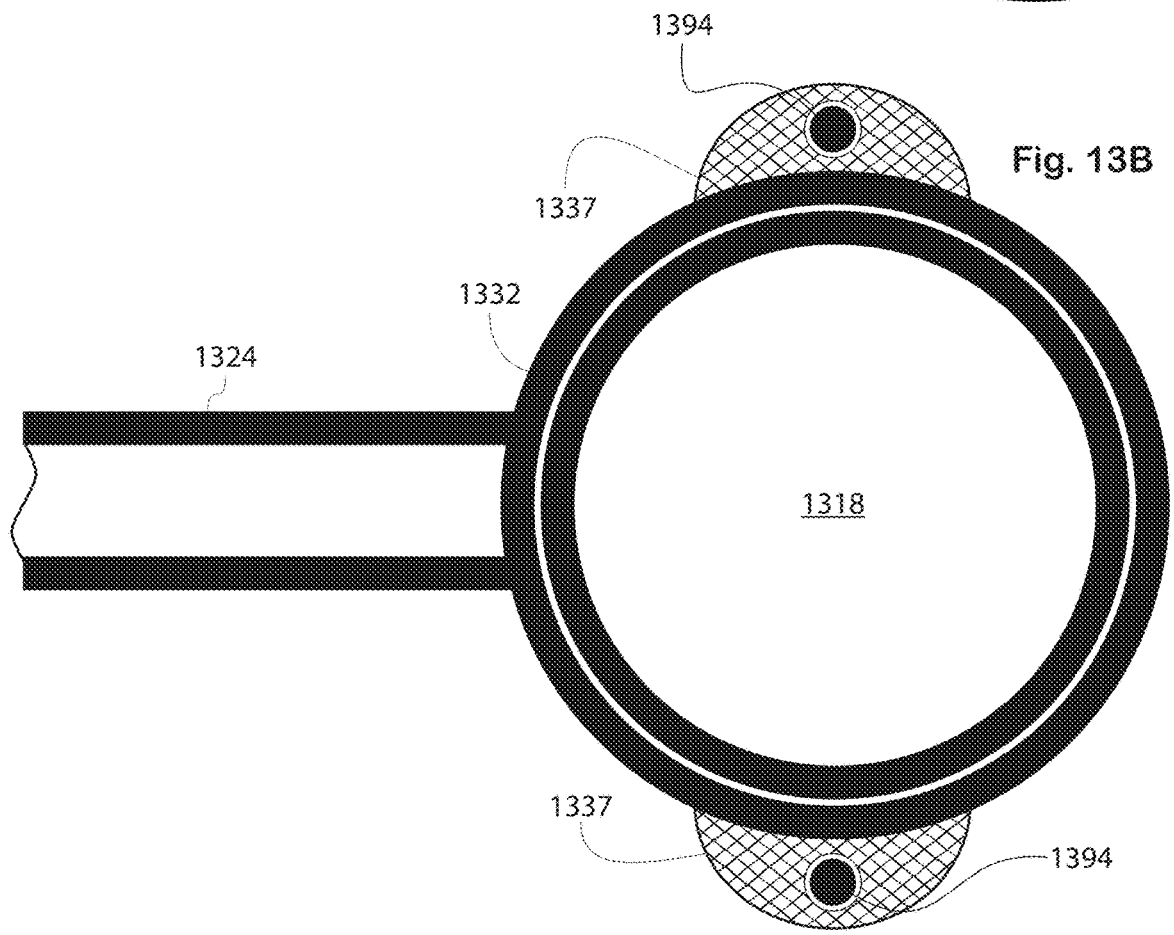
FIG. 13B a schematic, cross-sectional depiction of the motion control system of FIG. 13A.

FIG. 13B schematically depicts a cross-section of motion control system 1330 of FIG. 13A.

As shown in the Figure, both sliding element 1332 and seat tube 1318 have a circular cross-section. An outer circumference of seat tube 1318 is closely encircled by an inner wall of sliding element 1332 that is rigidly connected to elevated chain stay 1334. Rotation of sliding element 1332 in a circumferential direction relative to a longitudinal axis of seat tube 1318 is inhibited by the two rod-shaped guide structures 1394 that pass through respective openings 1394 in structures 1337 located on opposite sides of an outer wall of sliding element 1332.

Examples of various embodiments are described in the following paragraphs.

Embodiment 1. A two-wheeled vehicle (100), comprising:
a forward frame portion (110) comprising a seat support portion (115);
a motion control system (130); and
a rear frame portion (120) movably interconnected to said forward frame portion by said motion control system, wherein
said motion control system, in response to a forward acceleration of said rear frame portion resulting from a driving force imparted by a wheel supported by said rear frame portion, imparts a force onto said forward frame portion that immediately accelerates said seat support portion in a forward direction.

Embodiment 2. The vehicle of Embodiment 1, wherein:
said motion control system imparts said force in a plurality of operating states of said motion control system, said plurality of operating states including a mid-range of a range of motion of said motion control system.

Embodiment 3. The vehicle of any one of the preceding embodiments, wherein:
said motion control system imparts said force irrespective of an operating state of said motion control system.

Embodiment 4. The vehicle of any one of the preceding embodiments, wherein:

said forward frame portion comprises said seat support portion in an upper region of said forward frame portion and a drive train axle support (119) in a lower region of said forward frame portion, and said motion control system, in response to said forward acceleration of said rear frame portion, imparts a force onto said forward frame portion that accelerates said seat support portion in said forward direction at an acceleration no less than an acceleration of said drive train axle support in said forward direction.

Embodiment 5. The vehicle of any one of the preceding embodiments, wherein:

said motion control system is configured such that said forward acceleration of said rear frame portion does not reduce an obstacle-avoiding range of motion of said motion control system.

Embodiment 6. The vehicle of any one of the preceding embodiments, wherein:

said motion control system comprises a sliding element (132).

Embodiment 7. The vehicle of embodiment 6, wherein:

said front frame portion comprises a tubular structure that extends from a lower region of said forward frame portion in a direction of said seat support portion, and said sliding element slides along said tubular structure.

Embodiment 8. The vehicle of embodiment 6 or 7, wherein:

said tubular structure is a seat tube (118).

Embodiment 9. The vehicle of any one of embodiments 6 to 8, wherein:

said sliding element is rigidly connected to a rear axle support of said rear frame portion.

Embodiment 10. The vehicle of any one of embodiments 6 to 9, wherein:

said sliding element is a sleeve, and said rear axle support and said sleeve are elements of a unitary chain stay structure (124).

Embodiment 11. The vehicle of any one of the preceding embodiments, wherein:

said motion control system movably interconnects said rear frame portion and said forward frame portion such that motion of said rear frame portion relative to said forward frame portion is restricted to substantially in-plane motion.

Embodiment 12. The vehicle of embodiment 6, wherein:

said front frame portion comprises a tubular structure (632) in a bottom bracket region (617) of said front frame portion, and said tubular structure slidingly engages said sliding element (626).

Embodiment 13. The vehicle of embodiment 12, wherein:

said sliding element is rigidly connected to a rear axle support of said rear frame portion.

Embodiment 14. The vehicle of embodiment 13, wherein:

said rear axle support and said sleeve are elements of a unitary chain stay structure (624).

Embodiment 15. The vehicle of any one of the preceding embodiments, wherein:

said force onto said forward frame portion immediately accelerates said seat support portion in an upward direction.

In the present disclosure, the verb "may" is used to designate optionally/noncompulsoriness. In other words, something that "may" can, but need not. In the present disclosure, the verb "comprise" may be understood in the sense of including. Accordingly, the verb "comprise" does not exclude the presence of other elements/actions. In the present disclosure, relational terms such as "first," "second," "top," "bottom" and the like may be used solely to distinguish one entity or action from another entity or action without necessarily requiring or implying any actual such relationship or order between such entities or actions.

In the present disclosure, the term "any" may be understood as designating any number of the respective elements, e.g. as designating one, at least one, at least two, each or all of the respective elements. Similarly, the term "any" may be understood as designating any collection(s) of the respective elements, e.g. as designating one or more collections of the respective elements, wherein a (respective) collection may comprise one, at least one, at least two, each or all of the respective elements. The respective collections need not comprise the same number of elements.

In the present disclosure, the expression "at least one" is used to designate any (integer) number or range of (integer) numbers (that is technically reasonable in the given context). As such, the expression "at least one" may, inter alia, be understood as one, two, three, four, five, ten, fifteen, twenty or one hundred. Similarly, the expression "at least one" may, inter alia, be understood as "one or more," "two or more" or "five or more."

In the present disclosure, expressions in parentheses may be understood as being optional. As used in the present disclosure, quotation marks may emphasize that the expression in quotation marks may also be understood in a figurative sense. As used in the present disclosure, quotation marks may identify a particular expression under discussion.

In the present disclosure, many features are described as being optional, e.g. through the use of the verb "may" or the use of parentheses. For the sake of brevity and legibility, the present disclosure does not explicitly recite each and every combination and/or permutation that may be obtained by choosing from the set of optional features. However, the present disclosure is to be interpreted as explicitly disclosing all such combinations/permutations. For example, a system described as having three optional features may be embodied in seven different ways, namely with just one of the three possible features, with any two of the three possible features or with all three of the three possible features.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of the invention, even those disclosed solely in combination with other features of the invention, may be combined in any configuration excepting those readily apparent to the person skilled in the art as nonsensical. Likewise, use of the singular and plural is solely for the sake of illustration and is not to be interpreted as limiting. Except where the contrary is explicitly noted, the plural may be replaced by the singular and vice-versa.

The invention claimed is:

1. A two-wheeled vehicle, comprising:
 a forward frame portion comprising a seat support portion;
 a motion control system; and
 a rear frame portion movably interconnected to said forward frame portion by said motion control system, wherein
 said motion control system, in response to a forward acceleration of said rear frame portion resulting from a driving force imparted by a wheel supported by said rear frame portion, imparts a force onto said forward frame portion that immediately accelerates said seat support portion in an upward and forward direction.

2. The vehicle of claim 1, wherein:
said motion control system imparts said force in a plurality of operating states of said motion control system, said plurality of operating states including a mid-range of a range of motion of said motion control system.

3. The vehicle of claim 1, wherein:
said motion control system imparts said force irrespective of an operating state of said motion control system.

4. The vehicle of claim 1, wherein:
said forward frame portion comprises said seat support portion in an upper region of said forward frame portion and a drive train axle support in a lower region of said forward frame portion, and
said motion control system, in response to said forward acceleration of said rear frame portion, imparts a force onto said forward frame portion that accelerates said seat support portion in said forward direction at an acceleration no less than an acceleration of said drive train axle support in said forward direction.

5. The vehicle of claim 1, wherein:
said motion control system is configured such that said forward acceleration of said rear frame portion does not reduce an obstacle-avoiding range of motion of said motion control system.

6. The vehicle of claim 1, wherein:
said motion control system comprises a sliding element.

7. The vehicle of claim 6, wherein:
said front frame portion comprises a tubular structure that extends from a lower region of said forward frame portion in a direction of said seat support portion, and
said sliding element slides along said tubular structure.

8. The vehicle of claim 1, wherein:
said motion control system movably interconnects said rear frame portion and said forward frame portion such that motion of said rear frame portion relative to said forward frame portion is restricted to substantially in-plane motion.

9. A two-wheeled vehicle, comprising:
a forward frame portion comprising a seat support portion and a tubular seat tube that extends from a lower region of said forward frame portion in a direction of said seat support portion;
a motion control system comprising a sliding element that slides along said tubular seat tube; and
a rear frame portion movably interconnected to said forward frame portion by said motion control system, wherein
said motion control system, in response to a forward acceleration of said rear frame portion resulting from a driving force imparted by a wheel supported by said rear frame portion, imparts a force onto said forward frame portion that immediately accelerates said seat support portion in a forward direction.

10. The vehicle of claim 9, wherein said motion control system movably interconnects said rear frame portion and said forward frame portion such that motion of said rear frame portion relative to said forward frame portion is restricted to substantially in-plane motion.

11. The vehicle of claim 9, wherein said motion control system is configured such that said forward acceleration of said rear frame portion does not reduce an obstacle-avoiding range of motion of said motion control system.

12. A two-wheeled vehicle, comprising:
a forward frame portion comprising a seat support portion;
a motion control system comprising a sliding element; and
a rear frame portion movably interconnected to said forward frame portion by said motion control system; wherein
said motion control system, in response to a forward acceleration of said rear frame portion resulting from a driving force imparted by a wheel supported by said rear frame portion, imparts a force onto said forward frame portion that immediately accelerates said seat support portion in a forward direction; and
said sliding element is rigidly connected to a rear axle support of said rear frame portion.

13. The vehicle of claim 12, wherein:
said sliding element is a sleeve, and
said rear axle support and said sleeve are elements of a unitary chain stay structure.

14. The vehicle of claim 12, wherein:
cross-sectional shapes of said sliding element and said tubular structure engage to movably interconnect said rear frame portion and said forward frame portion such that motion of said rear frame portion relative to said forward frame portion is restricted to substantially in-plane motion.

15. The vehicle of claim 12, wherein:
said motion control system further comprising an anti-rotational structure that restricts relative motion of said rear frame portion relative and said forward frame portion to substantially in-plane motion.

16. A two-wheeled vehicle, comprising:
a forward frame portion comprising a seat support portion, and a tubular structure in a bottom bracket region of said front frame portion;
a motion control system comprising a sliding element; and
a rear frame portion movably interconnected to said forward frame portion by said motion control system; wherein
said motion control system, in response to a forward acceleration of said rear frame portion resulting from a driving force imparted by a wheel supported by said rear frame portion, imparts a force onto said forward frame portion that immediately accelerates said seat support portion in a forward direction;
said tubular structure slidingly engages said sliding element; and
said sliding element is rigidly connected to a rear axle support of said rear frame portion.

17. The vehicle of claim 16, wherein:
said rear axle support and said sliding element are elements of a unitary chain stay structure.

18. The vehicle of claim 17, wherein:
said sliding element is disposed inside of said tubular structure;
said tubular structure comprising an opening to allow a portion of said unitary chain stay structure to extend through said opening.

19. The vehicle of claim 16, wherein:
said tubular structure having a lower end and an upper end, said upper end positioned rearward of said lower end.

20. The vehicle of claim 19, wherein:
said bottom bracket region comprising a drive train axle support;
said tubular structure positioned in said front frame portion to have an acute angle in the range of 30 degrees to 60 degrees between a longitudinal axis of said tubular structure and an imaginary straight line through an axis of said rear axle support and an axis of said drive train axle support.

\* \* \* \* \*